United States Patent
L'Herault et al.

(10) Patent No.: US 11,999,421 B2
(45) Date of Patent: Jun. 4, 2024

(54) TRACK SYSTEM

(71) Applicant: SOUCY INTERNATIONAL INC., Drummondville (CA)

(72) Inventors: Patrick L'Herault, St-Majorique-de-Grantham (CA); Louis-Frederic Marchildon, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 0 days.

(21) Appl. No.: 17/964,262

(22) Filed: Oct. 12, 2022

(65) Prior Publication Data

US 2023/0036229 A1   Feb. 2, 2023

Related U.S. Application Data

(63) Continuation of application No. 16/607,253, filed as application No. PCT/US2017/029020 on Apr. 22, 2017, now Pat. No. 11,498,631, which is a continuation-in-part of application No. 14/920,783, filed on Oct. 22, 2015, now abandoned.

(51) Int. Cl.
| | |
|---|---|
| *B62D 55/12* | (2006.01) |
| *B62D 55/04* | (2006.01) |
| *B62D 55/06* | (2006.01) |
| *B62D 55/14* | (2006.01) |
| *B62D 55/15* | (2006.01) |
| *B62D 55/24* | (2006.01) |
| *B62D 55/30* | (2006.01) |

(52) U.S. Cl.
CPC ............ *B62D 55/15* (2013.01); *B62D 55/04* (2013.01); *B62D 55/06* (2013.01); *B62D 55/12* (2013.01); *B62D 55/14* (2013.01); *B62D 55/244* (2013.01); *B62D 55/30* (2013.01)

(58) Field of Classification Search
CPC ......... B62D 55/06; B62D 55/12; B62D 55/14
See application file for complete search history.

(56) References Cited

U.S. PATENT DOCUMENTS

| | | | |
|---|---|---|---|
| 3,839,908 A * | 10/1974 | Casper .................... | G01L 5/06 73/862.471 |
| 3,888,132 A | 6/1975 | Russ | |
| 5,511,869 A | 4/1996 | Edwards et al. | |
| 6,406,655 B1 * | 6/2002 | Courtemanche ........ | B29C 43/18 156/137 |

(Continued)

*Primary Examiner* — Kevin Hurley
*Assistant Examiner* — Hosam Shabara
(74) *Attorney, Agent, or Firm* — BCF LLP

(57) ABSTRACT

Track system to be mounted on a vehicle in place of a rotatable OEM tire/wheel assembly, including: A frame. A drive wheel is rotatably mounted on the frame, operatively connectable to the drive shaft of the vehicle, and has a diameter of between 65% and 100% of the OEM tire diameter. Leading and trailing idler wheel assemblies are mounted on the frame. An endless track having an inner surface is disposed around the drive wheel, the leading and trailing idler wheel assemblies. The endless track has an unsupported portion between the drive wheel and one of the leading and trailing idler wheel assemblies. The unsupported portion has a length and a center. The unsupported portion deflects a distance of between 8% and 12% of its length on application of a 25-lb. force at its center.

19 Claims, 22 Drawing Sheets

(56) References Cited

U.S. PATENT DOCUMENTS

| | | | |
|---|---|---|---|
| 7,201,242 B2* | 4/2007 | Tucker, Jr. | B62D 55/125 |
| | | | 180/9.1 |
| 7,533,945 B2* | 5/2009 | Jee | B62D 55/244 |
| | | | 305/171 |
| 8,002,365 B2* | 8/2011 | Jacobsen | B62D 55/26 |
| | | | 305/132 |
| 8,794,358 B2 | 8/2014 | Hansen | |
| 9,796,434 B2 | 10/2017 | Alidan et al. | |
| 10,421,507 B2 | 9/2019 | Cox | |
| 11,352,078 B2 | 6/2022 | Zuchoski | |
| 11,498,631 B2* | 11/2022 | L'Herault | B62D 55/244 |
| 2009/0195061 A1* | 8/2009 | Bellemare | B62D 55/244 |
| | | | 305/157 |
| 2010/0230185 A1* | 9/2010 | Mallette | B62D 55/26 |
| | | | 180/9.44 |
| 2012/0242141 A1 | 9/2012 | Bessette et al. | |
| 2014/0008134 A1* | 1/2014 | Zuchoski | B62D 55/10 |
| | | | 305/132 |
| 2015/0345109 A1 | 12/2015 | Vik et al. | |
| 2016/0114840 A1* | 4/2016 | L'Herault | B62D 55/065 |
| | | | 305/167 |
| 2020/0277012 A1 | 9/2020 | Thompson et al. | |
| 2022/0161875 A1 | 5/2022 | Apostolopoulos et al. | |

* cited by examiner

TRACK SYSTEM

CROSS-REFERENCE TO RELATED APPLICATIONS

The present application is continuation application of U.S. patent application 16/607,253, filed on Apr. 22, 2017, which is a continuation-in-part of U.S. patent application Ser. No. 14/920,783, filed Oct. 22, 2015, entitled "High Performance Track System for a Vehicle". Through the '783 application, the present application claims priority to United States Provisional Patent Application No. 62/067,153, filed Oct. 22, 2014, entitled "High Performance Track System for a Vehicle". The entirety of both of those applications is incorporated herein by reference.

FIELD

The present technology relates to track systems to be mounted on a vehicle in place of a rotatable tire/wheel assembly.

BACKGROUND

Nowadays, there are an ever-increasing number of people who enjoy riding all-terrain vehicles and other similar off-road vehicles. There are generally two main uses for these vehicles, working and riding. In order to further adapt these vehicles to the increasing variety of terrains and surfaces on which they are ridden, companies have started to offer track systems which can be used to replace the wheels on these vehicles. These track systems are mainly designed for working applications.

Generally, a conventional track system assembly comprises a frame, a drive or sprocket wheel, idler wheels, support rollers and an endless elastomeric track disposed therearound and cooperating therewith. By using an endless track instead of regular tire, a track system generally provides increased floatation and better traction since the ground contacting area, (also referred to as the contact patch) of the endless track is generally significantly larger than the contact patch of a regular tire. Also, a smaller sprocket wheel diameter in the order of 60% of the OEM wheel diameter has generally been required to compensate for the increased rolling resistance of the track system.

In short, the larger ground contacting area of the endless track effectively spreads the force of the vehicle over a larger area (i.e. increased floatation) and provides additional ground-engaging surface to the vehicle (e.g. increased traction), but results in a speed loss and higher gas consumption.

Though the larger contact patch of the endless track of the track system is generally a significant advantage when the vehicle is ridden on soft surfaces such as snow, mud or sand, the larger contact patch can become a hindrance when the vehicle is ridden on harder surfaces such as concrete, asphalt, snow groomed trail or pavement.

Indeed, the larger contact patch generally implies more friction between the track and the ground, making the vehicle more difficult to steer and maneuver. Also, the smaller sprocket wheel diameter, which is generally an advantage over soft terrain, becomes a hindrance when riding on harder surfaces (such as a groomed snow trail) because of the top speed loss. This is why tires are generally used over these hard surfaces and terrains, see FIGS. 1 and 2 showing prior art example.

Particularly on a snow groomed trails, tires are still not the best option as they have many disadvantages such as lack of traction, difficulty to get out of ruts, high speed instability, cornering instability, etc.

Hence, there is a need for an improved track system which attempts to mitigate the aforementioned shortcomings.

SUMMARY

It is an object of the present technology to ameliorate at least some of the inconveniences present in the prior art.

The shortcomings of the prior art may in some cases be mitigated by providing a track system having larger diameter sprocket wheel in combination with a lower track tension. In some circumstances, the larger diameter sprocket wheel and lower track tension allow the track system to achieve better performance than conventional track systems, especially on harder surfaces.

In one aspect, the present technology provides a track system to be mounted on a vehicle in place of a rotatable tire/wheel assembly, the vehicle having a chassis, the rotatable tire/wheel assembly with an OEM tire diameter and an OEM tire width, and a drive shaft, the track system comprising:
  a frame;
  a drive wheel rotatably mounted on the frame, and operatively connectable to the drive shaft of the vehicle, the drive wheel having a diameter of between 65% and 100% of the OEM tire diameter (in the present context of the present disclosure, a "drive shaft" is a vehicle shaft that rotates to transmit power from the vehicle's engine, torque, and rotation to a ground-engaging element (e.g. wheel) of the vehicle);
  a leading idler wheel assembly mounted on the frame (in the context of the present disclosure, a "leading" component is the one (of such components) that is closest to front of the vehicle when the track system is correctly installed on a vehicle);
  a trailing idler wheel assembly mounted on the frame (in the context of the present disclosure, a "trailing" component is the one (of such components) that is closest to the rear of the vehicle when the track system is correctly installed on a vehicle);
  an endless track having an inner surface (i.e. the wheel-engaging surface) disposed around the drive wheel, the leading idler wheel assembly, and the trailing idler wheel assembly, the endless track having an unsupported portion between the drive wheel and one of the leading idler wheel assembly and the trailing idler wheel assembly, the unsupported portion having a length and a center, the unsupported portion deflecting a distance of between 8% and 12% of its length on application of a 25-lb. force at its center.

Original equipment manufacturers (OEMs) of vehicles such as all-terrain vehicles (ATVs), side-by-side vehicles (SSVs), or utility-terrain vehicles (UTVs), etc., (for example those vehicles branded as Polaris™ vehicles, or Honda™ vehicles, etc.) sell their newly-manufactured vehicles from the factory with tires. In the context of the present disclosure, those tires that are placed on brand new vehicles sold by the manufacturers are referred to as OEM tires, notwithstanding the fact that that such vehicles may, in some case, be able to accept tires of different sizes, makes, or models, than the OEM tires. As an example, ATV tires are typically described by a sequence of three numbers separated by dashes and/or x's, for example A×B-C (e.g., 25×10-12). The first number in the sequence (e.g. A or 25) is the tire height (tire diameter). The second number in the sequence (e.g. B or 10) is the tire width. The third number in the sequence (e.g., C or 12) is the wheel diameter. An ATV manufacturer may sell its ATVs equipped with 25×10–12 tires/wheels, but that same ATV might be able to accept different size tires (e.g. 26×11–12).

In some embodiments of the present technology, the drive wheel is a sprocket wheel having a plurality of teeth. (It is known in the art to have drive wheels that are not sprocket wheels.) In some such embodiments of the present technology, the endless track has a plurality of spaced-apart apertures dimensioned and longitudinally-positioned along the endless track to intermesh with the teeth of the sprocket wheel. In some such embodiments of the present technology the endless track has a plurality of metallic clips longitudinally-positioned along the inner surface of the endless track between the plurality of apertures.

In some embodiments of the present technology there is a slide rail along a bottom of the frame, the slide rail being positioned with respect the endless track such that as the endless track rotates the clips contact the slide rail along a lower run of the track.

In some embodiments of the present technology, the inner surface of the endless track has a first plurality of longitudinally-spaced drive-wheel-contacting guide lugs positioned to engage an inner side of the drive wheel, and the inner surface of the endless track has a second plurality of longitudinally-spaced drive-wheel-contacting guide lugs positioned to engage an outer side of the drive wheel.

In the context of the present disclosure, an "inner" wheel or roller is that one that is closer to the vehicle when the track system is correctly mounted to the vehicle (and steered straight, if applicable). Similarly, an "inner" side of a wheel or roller is that one that faces the vehicle when the track system is correctly mounted to the vehicle (and steered straight, if applicable). By contrast, in the context of the present disclosure, an "outer" wheel or roller that one that is further from the vehicle when the track system is correctly mounted to the vehicle (and steered straight, if applicable). Similarly, an "outer" side of a wheel or roller is that one that faces away from the vehicle when the track system is correctly mounted to the vehicle (and steered straight, if applicable).

In some embodiments of the present technology, the leading idler wheel assembly has an inner leading idler wheel and an outer leading idler wheel; and the trailing idler wheel assembly has an inner trailing idler wheel and an outer leading idler wheel. The inner surface of the endless track has a first plurality of longitudinally-spaced idler-wheel-contacting guide lugs positioned to engage an outer side of the outer leading idler wheel and the outer side of the outer trailing idler wheel. The the inner surface of the endless track has a second plurality of longitudinally-spaced idler-wheel-contacting guide lugs positioned to engage an inner side of the inner leading idler wheel and the inner side of the inner trailing idler wheel. The inner surface of the endless track has a third plurality of longitudinally-spaced idler-wheel-contacting guide lugs positioned to engage an inner side of the outer leading idler wheel and the inner side of the outer trailing idler wheel. The inner surface of the endless track has a fourth plurality of longitudinally-spaced idler-wheel-contacting guide lugs positioned to engage an outer side of the inner leading idler wheel and the outer side of the inner trailing idler wheel.

In some embodiments of the present technology, the first plurality of longitudinally-spaced idler-wheel-contacting guide lugs and the second plurality of longitudinally-spaced idler-wheel-contacting guide lugs have a same lug spacing, being a first lug spacing. (In the context of the present disclosure the "lug spacing" is the longitudinal distance between the lateral centerlines of successive lugs.) The third plurality of longitudinally-spaced idler-wheel-contacting guide lugs and the fourth plurality of longitudinally-spaced idler-wheel-contacting guide lugs have a same lug spacing, being a second lug spacing. The second lug spacing is greater than the first lug spacing. In some such embodiments of the present technology, the second lug spacing is twice the first lug spacing.

In some embodiments of the present technology, the first plurality of longitudinally-spaced drive-wheel-contacting guide lugs and the second plurality of longitudinally-spaced drive-wheel-contacting guide lugs are positioned to be longitudinally spaced apart from the apertures in the endless track.

In some embodiments of the present technology the first plurality of longitudinally-spaced idler-wheel-contacting guide lugs are positioned along an edge of the endless track. The second plurality of longitudinally-spaced idler-wheel-contacting guide lugs are positioned along an opposite edge of the endless track.

In some embodiments of the present technology the track system has at least one support roller assembly mounted on the frame between the leading idler wheel assembly and the trailing idler wheel assembly. The first plurality of longitudinally-spaced idler-wheel-contacting guide lugs, the second plurality of longitudinally-spaced idler-wheel-contacting guide lugs, the third plurality of longitudinally-spaced idler-wheel-contacting guide lugs, and the fourth plurality of longitudinally-spaced idler-wheel-contacting guide lugs each engage a side of a support roller of the at least one support roller assembly.

In some embodiments of the present technology, the endless track has a width of between 75% and 125% of the OEM tire width. In some such embodiments of the present technology, the width of the endless track is less than 11½ inches.

In some embodiments of the present technology, the unsupported portion has a length of 15⅞ inches and the unsupported portion deflects a distance of between 1¼ inches and 1¾ inches on application of the 25-lb. force.

In some embodiments of the present technology the drive wheel has a diameter of between 68% and 97% of the OEM tire diameter.

In some embodiments of the present technology the drive is mountable to a wheel hub of the vehicle in place of the rotatable tire/wheel assembly to attach the track system to the vehicle.

In some embodiments of the present technology, the frame is mountable to the vehicle to attach the track system to the vehicle.

In some embodiments of the present technology, a track system has a sprocket wheel having a larger diameter (when compared with at least some conventional track systems' sprocket wheels) such that a ratio of the sprocket wheel diameter relative to the OEM tire diameter is between 65 to 100%.

In some embodiments of the present technology, a track system has a track that uses a lower track tension (as compared with at least some conventional track systems), which may improve the track system's performance while reducing rolling resistance between the endless track and the ground.

In some embodiments of the present technology, a track system has a narrower endless track (as compared with at least some conventional track systems), which may also improve driving conditions by potentially reducing the rolling resistance on harder surfaces.

In some embodiments of the present technology, a track system may provide the vehicle with higher performance compared with at least some conventional track systems because of the synergistic combination of the larger diameter sprocket wheel (or driving wheel) and lower track tension.

In some embodiments of the present technology, an endless track has a multiple guide lugs on its inner surface to assist in maintaining alignment of the track with respect to the idler wheels (and potentially the support rollers, where they are present), thus attempting to diminish the occurrence of "detracking" of the endless track from the track system. ("Detracking" is a term of aft describing the situation when the endless track becomes misaligned with respect to the wheels/rollers of a track system and may then come off the track system completely.)

In some embodiments of the present technology, a track system for replacing an OEM tire-wheel assembly of a vehicle, has a frame, a sprocket wheel pivotally mounted to the frame and operationally connected to a drive shaft of the vehicle, and a plurality of idler wheel assemblies pivotally mounted to the frame for guiding an endless track disposed around the plurality of idler wheel assemblies and the sprocket wheel. The sprocket wheel has a diameter between 65% and 100% of the diameter of the replaced OEM tire of the vehicle, and the endless track has a tension that is selected to attempt to reduce the occurrence of detracking of the endless track.

In another aspect, some embodiments of the present technology are directed to a vehicle equipped with a pair of track systems as defined herein above.

In another aspect, some embodiments of the present technology are directed to a vehicle equipped with a plurality of pairs of track systems as defined herein above.

In another aspect, some embodiments of the present technology are directed to a track system for replacing a tire-wheel assembly of a vehicle, the track system comprising a frame having a slide rail for guiding a lower run of an endless track and for limiting detracking of the endless track, a sprocket wheel having teeth rotatably mounted to the frame and operationally connected to a drive shaft of the vehicle, a plurality of idler wheel assemblies mounted to the frame for guiding the endless track disposed around the plurality of idler wheel assemblies and the sprocket wheel. The endless track has an inner (wheel-engaging) surface, an outer (ground-engaging) surface, widthwise reinforcing rods, and apertures to intermesh with the teeth of the sprocket wheel. The inner (wheel-engaging) surface has a plurality of guide lugs and, and the sprocket wheel has a diameter between 65% and 100% of the diameter of the OEM tire of the vehicle, and the endless track has a tension that is selected to attempt to reduce the occurrence of detracking of the endless (track tension limiting derailment) of the endless track.

In another aspect, some embodiments of the present technology are directed to a vehicle equipped with a pair of track systems as defined herein above.

In another aspect, some embodiments of the present technology are directed to a vehicle equipped with a plurality of pairs of track systems as defined herein above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first plurality" and "third plurality" is not intended to imply any particular order, type, chronology, hierarchy or ranking (for example) of/between the pluralities, nor is their use (by itself) intended imply that any "second plurality" must necessarily exist in any given situation.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings.

Due to the nature of the present technology, some of the drawings included with the present specification may be schematic in nature, and do not represent the precise positions of the various components relative to each other. It is intended that persons skilled in the art to whom the present specification is addressed will use the description and the drawings in concert with their common general knowledge to make and use the various aspects of the present technology.

Figure 1:
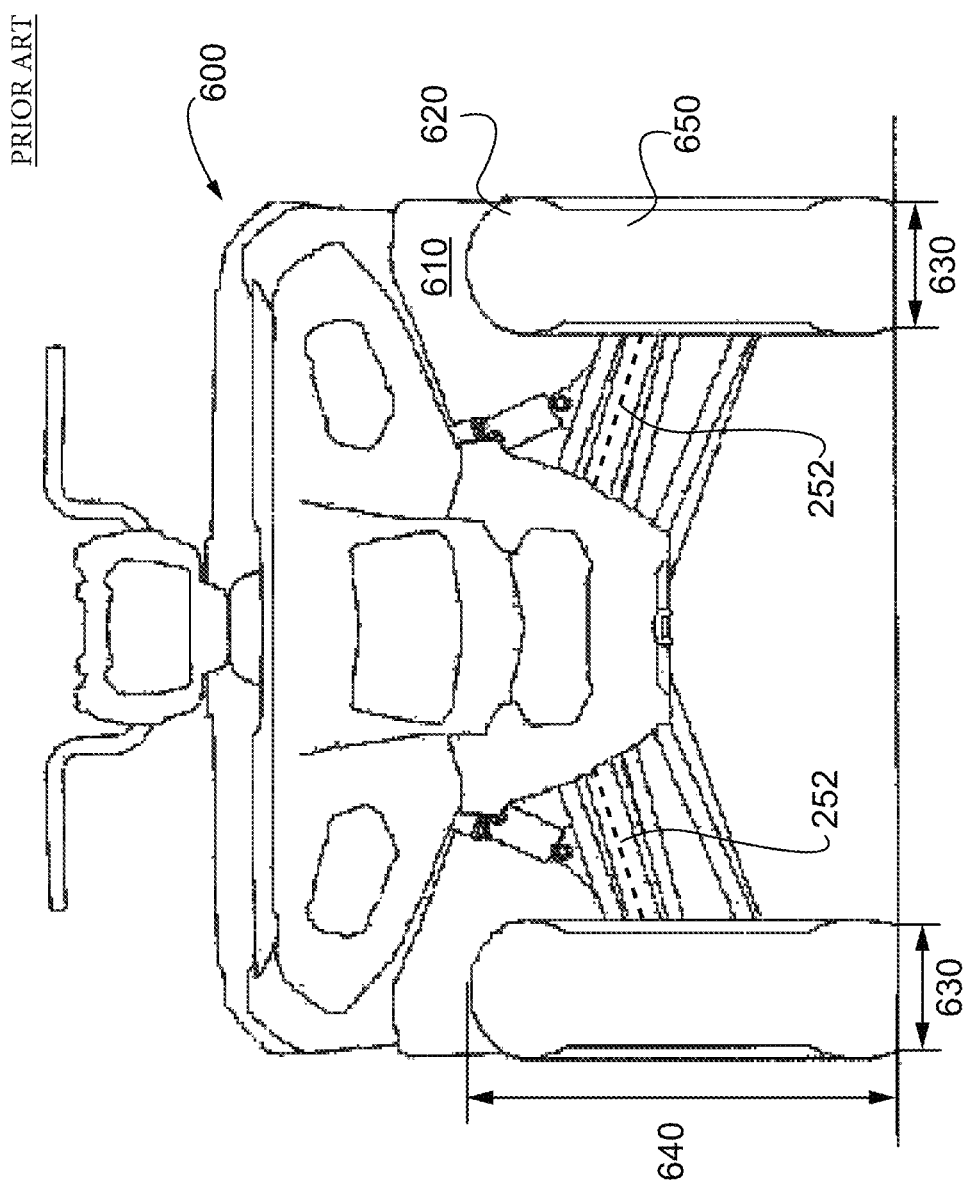

Also, due to the relatively small size of some of the components of the present technology, some of the components illustrated in the drawings included with the present specification may have been exaggerated, to make them more clearly visible.

Also, to maintain clarity of the interconnections of the various components of the vehicle and track systems shown in drawings, some parts of the vehicle and/or track system may have been omitted from the drawings, and some parts of the vehicle and/or track system may have been shown transparent to preserve a view of other parts that may otherwise be at least partially hidden on the drawings.

In the drawings:

FIG. 1 is a front elevation view of a prior art ATV.

Figure 2:
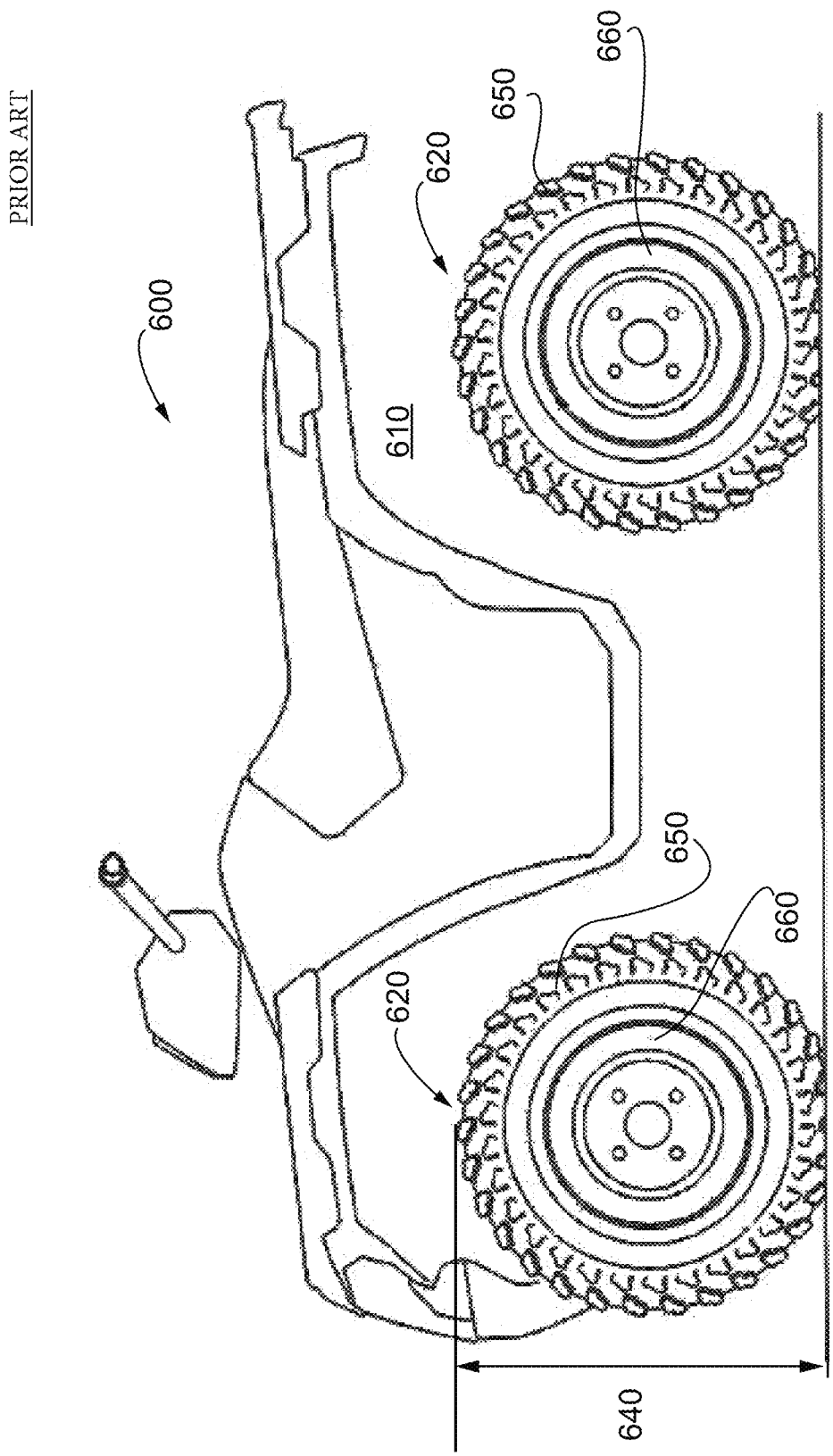

FIG. 2 is a right elevation view of the ATV of FIG. 1.

Figure 3:
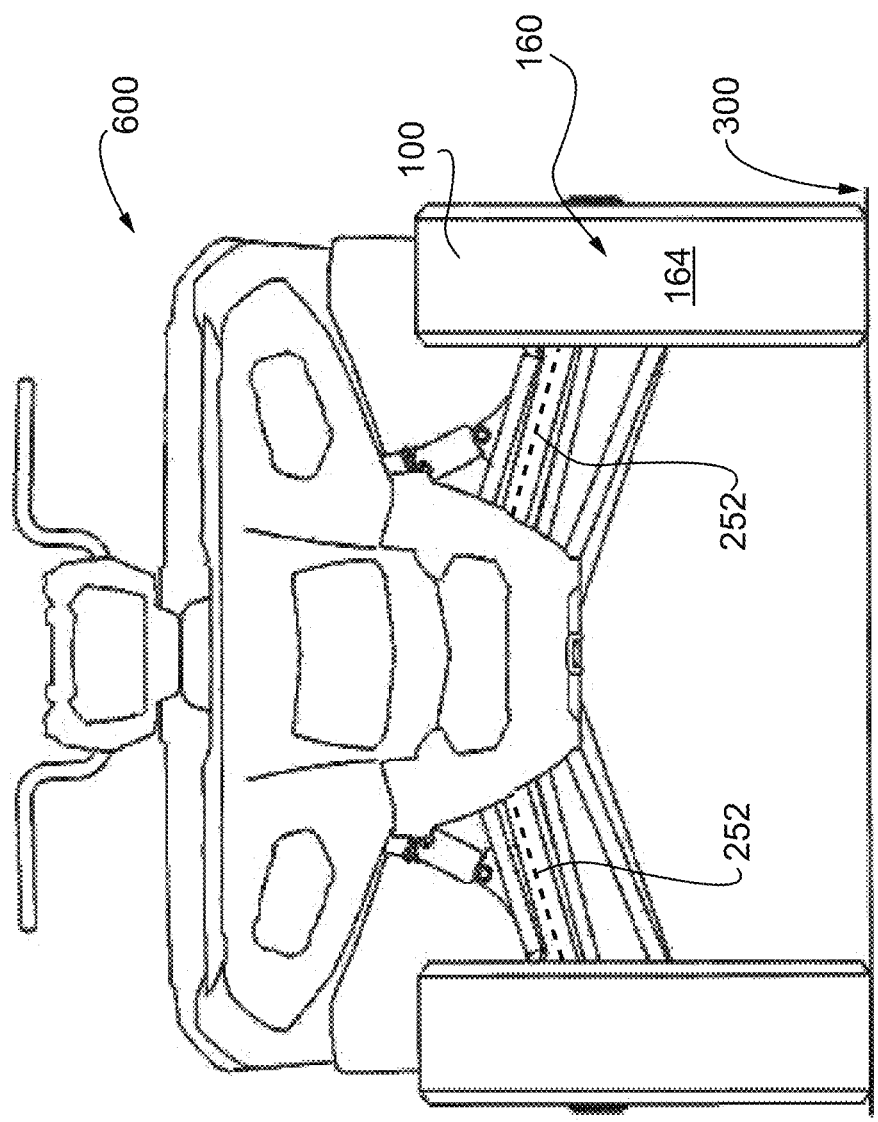

FIG. 3 is a front elevation view of an ATV having a track system according to an embodiment of the present technology.

Figure 4:
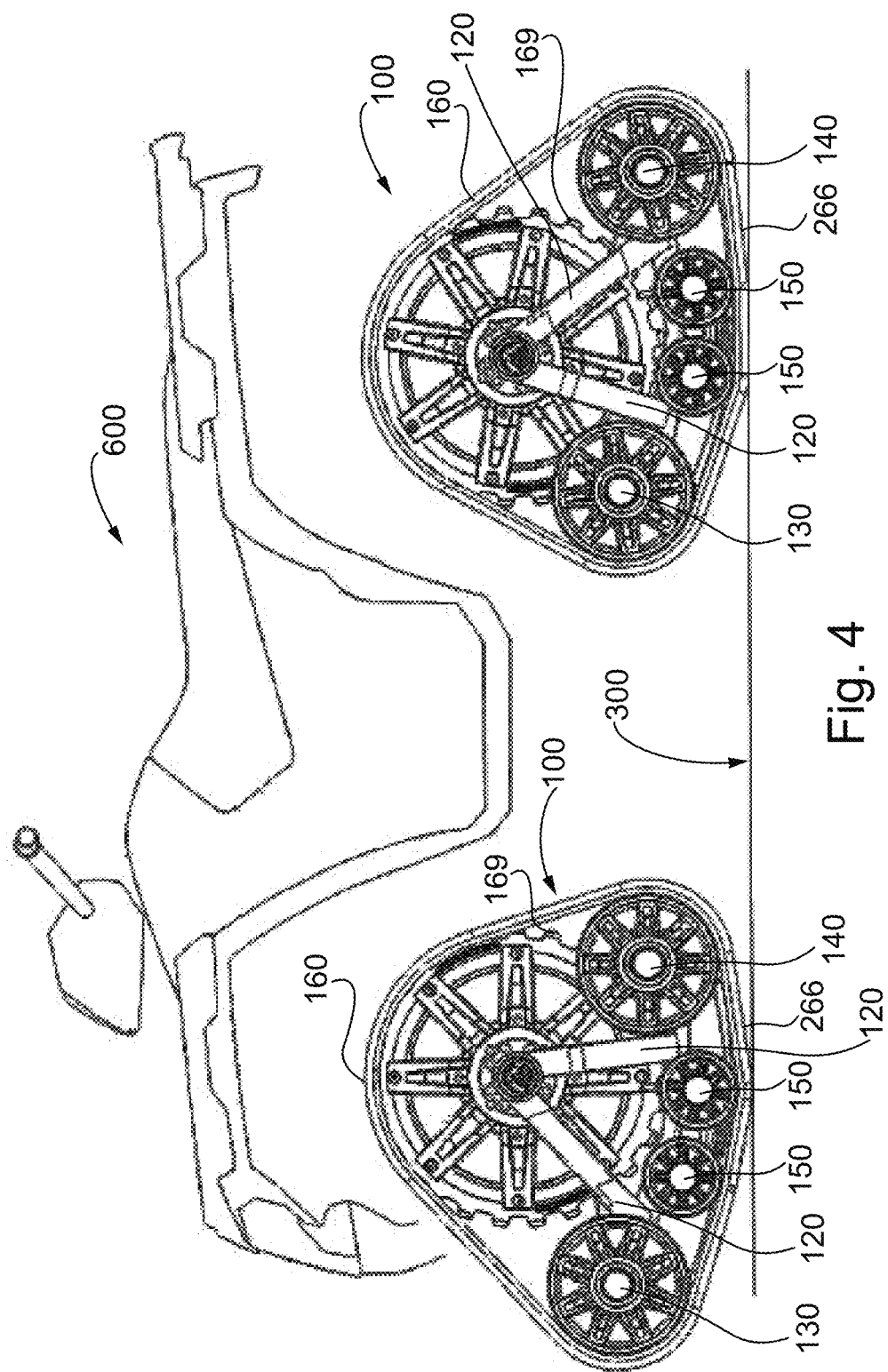

FIG. 4 is a right elevation view of the ATV of FIG. 3.

Figure 5:
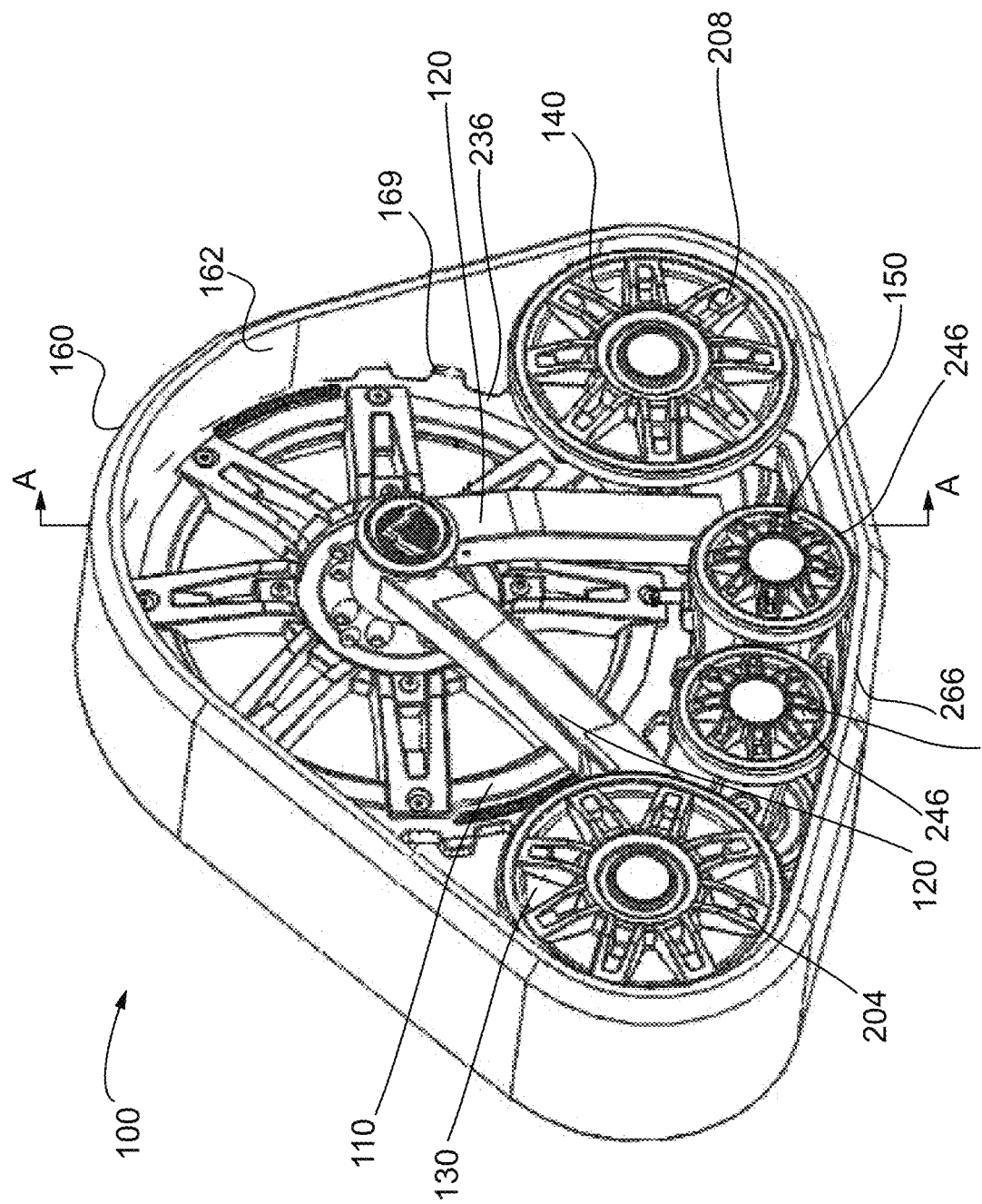

FIG. 5 is a perspective view of a track system being an embodiment of the present technology.

Figure 6:
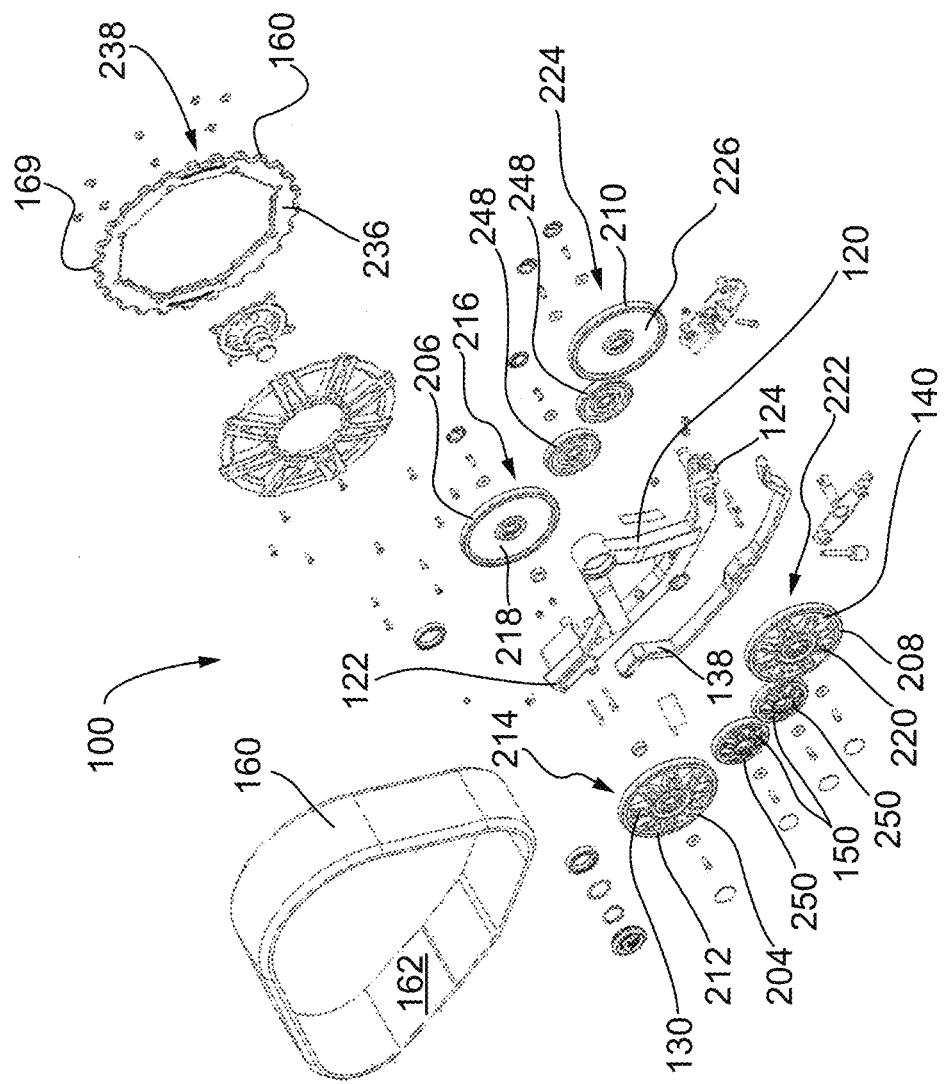

FIG. 6 is an exploded view of the track system as shown in FIG. 5

Figure 7:
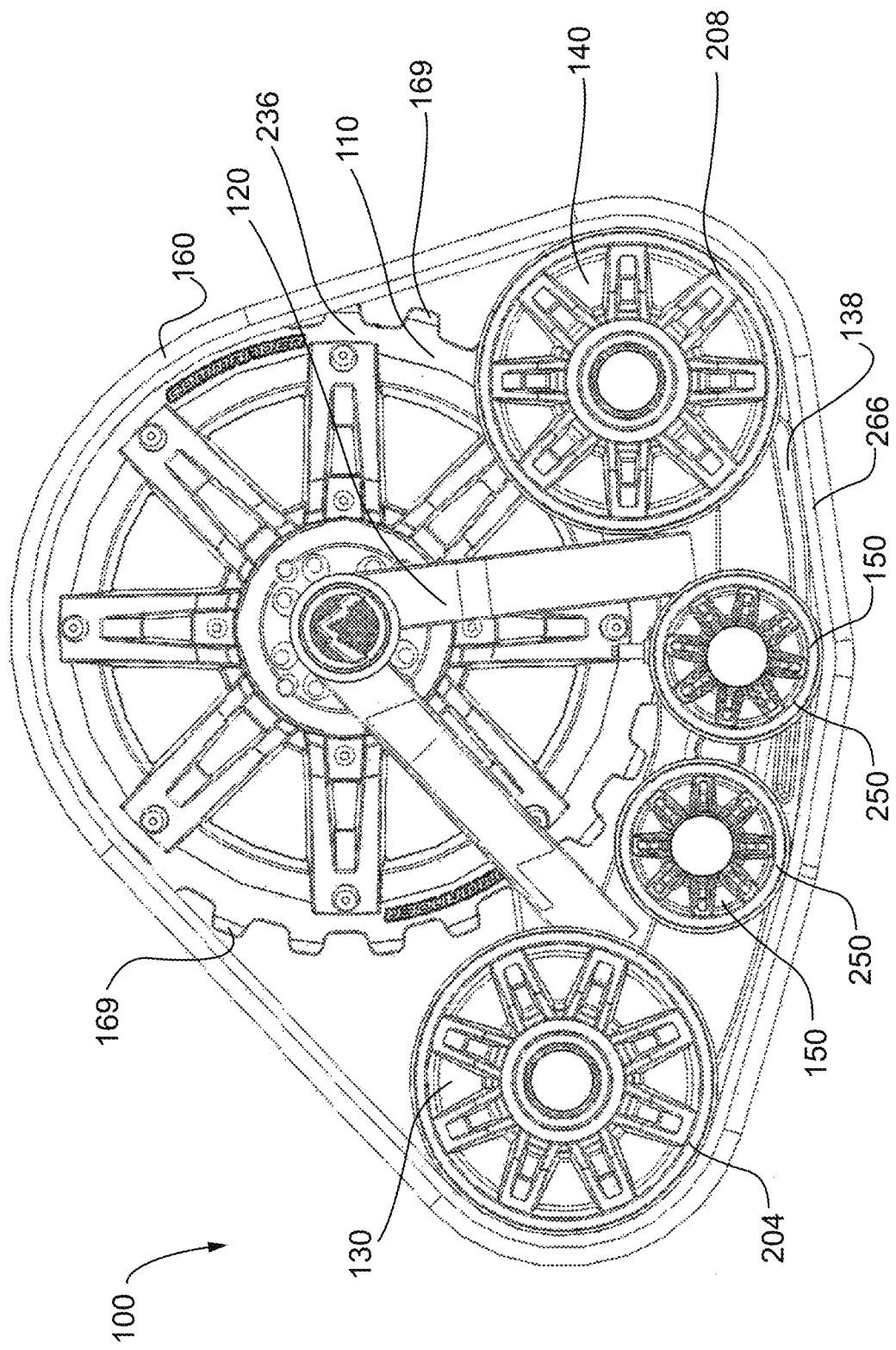

FIG. 7 is an outer elevation view of the track system as shown in FIG. 5.

Figure 8:
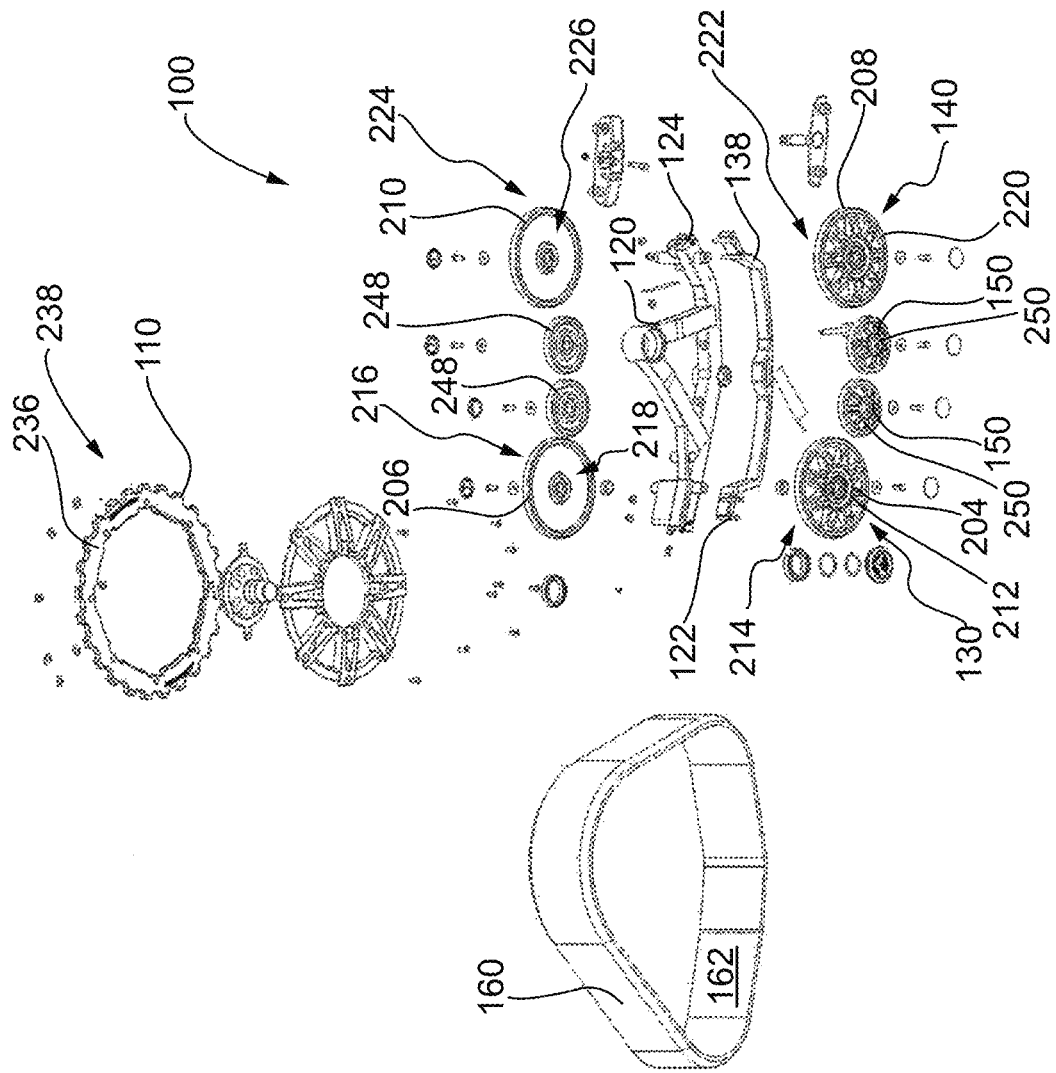

FIG. 8 is an exploded view of the track system as shown in FIG. 7.

Figure 9:
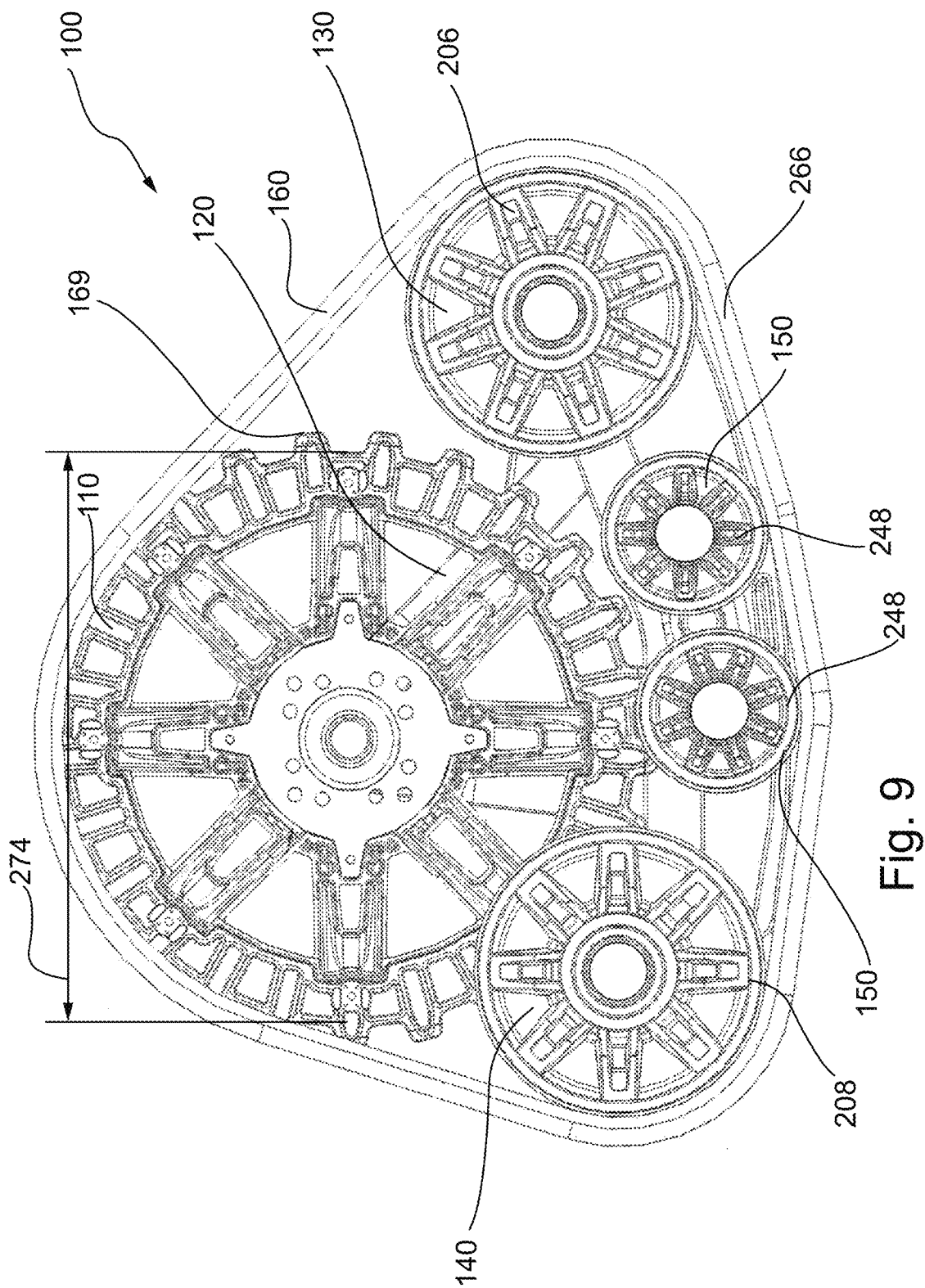

FIG. 9 is an inner elevation view of the track system as shown in FIG. 5.

Figure 10:
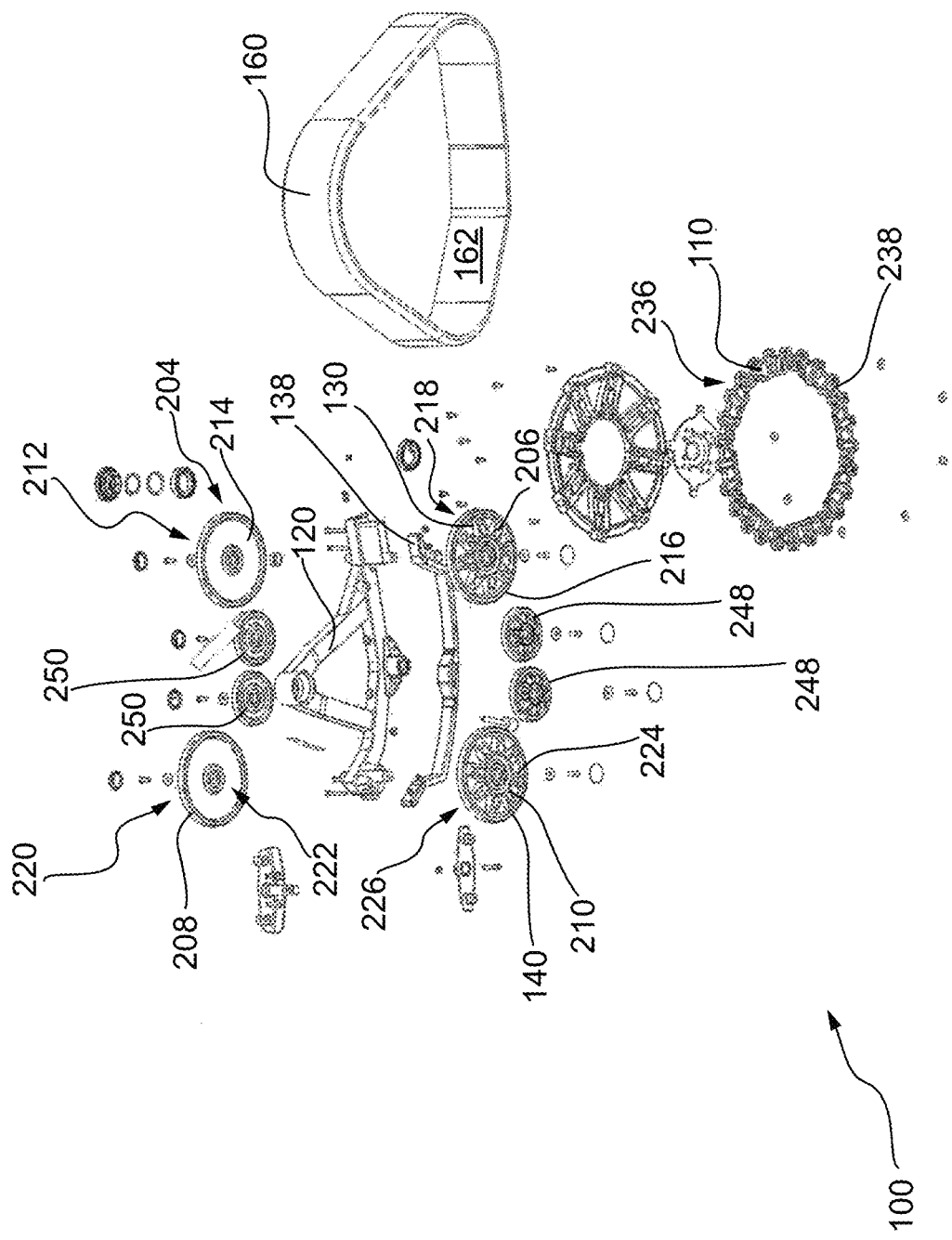

FIG. 10 is an exploded view of the track system as shown in FIG. 9.

Figure 11:
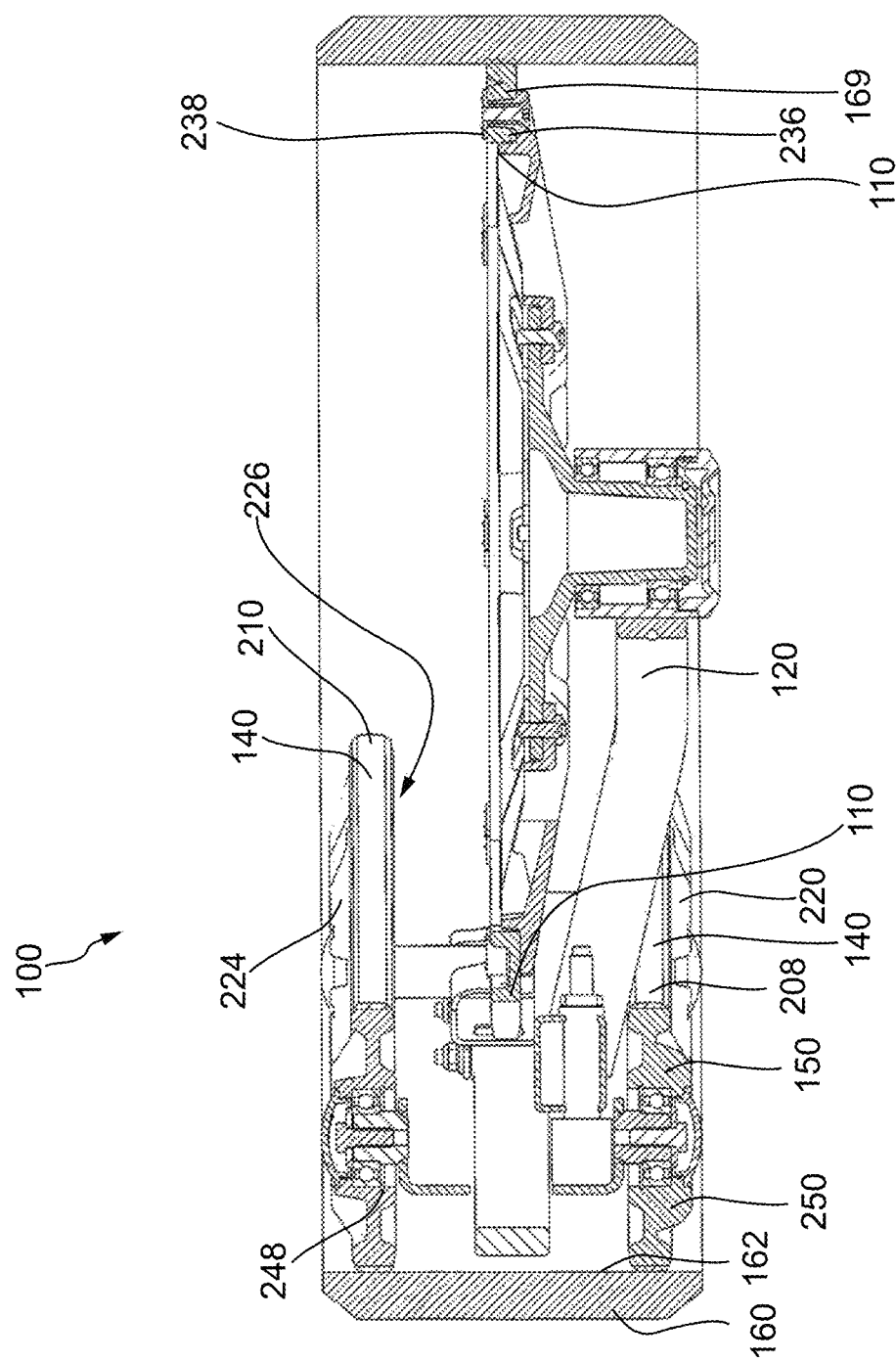

FIG. 11 is a cross sectional view along the line A-A of FIG. 5.

Figure 12:
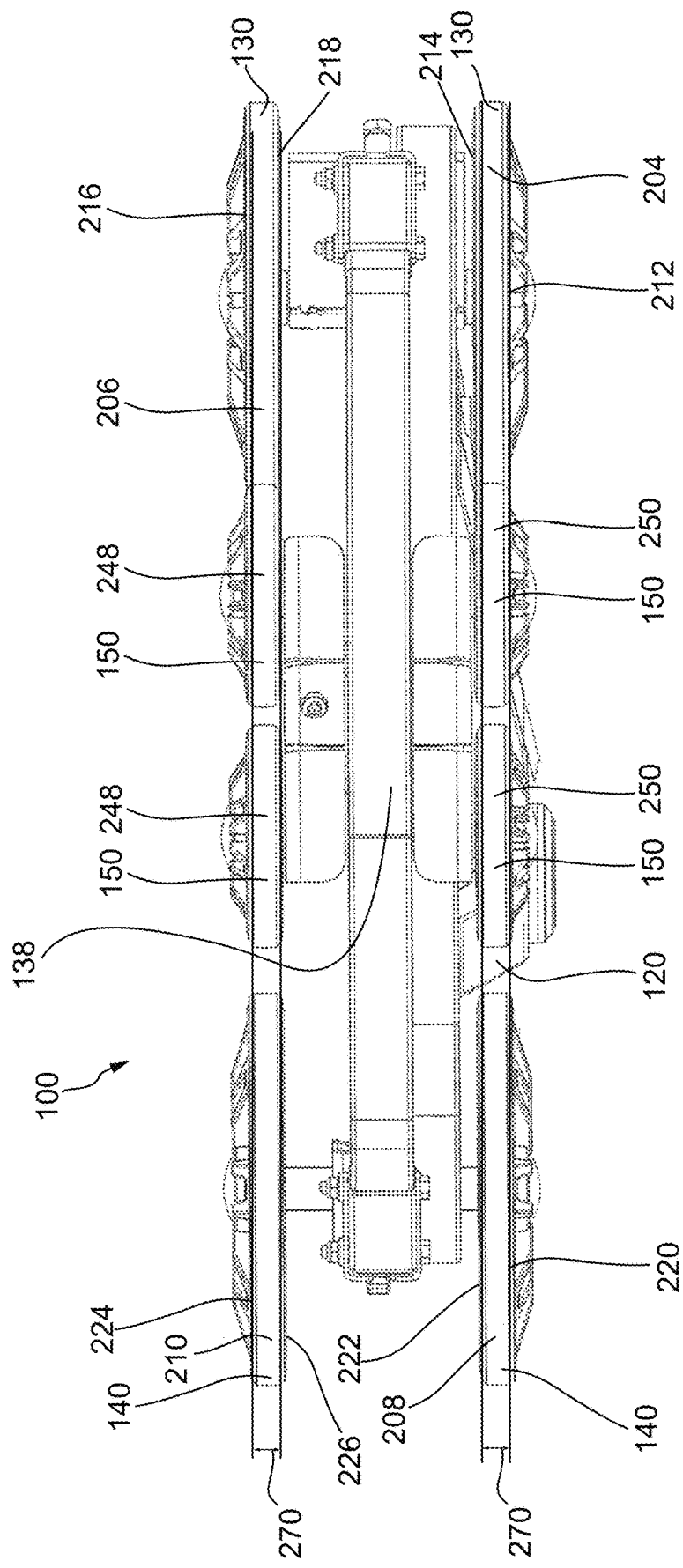

FIG. 12 is a bottom plan view of internal components of the track system as shown in FIG. 5.

Figure 13:
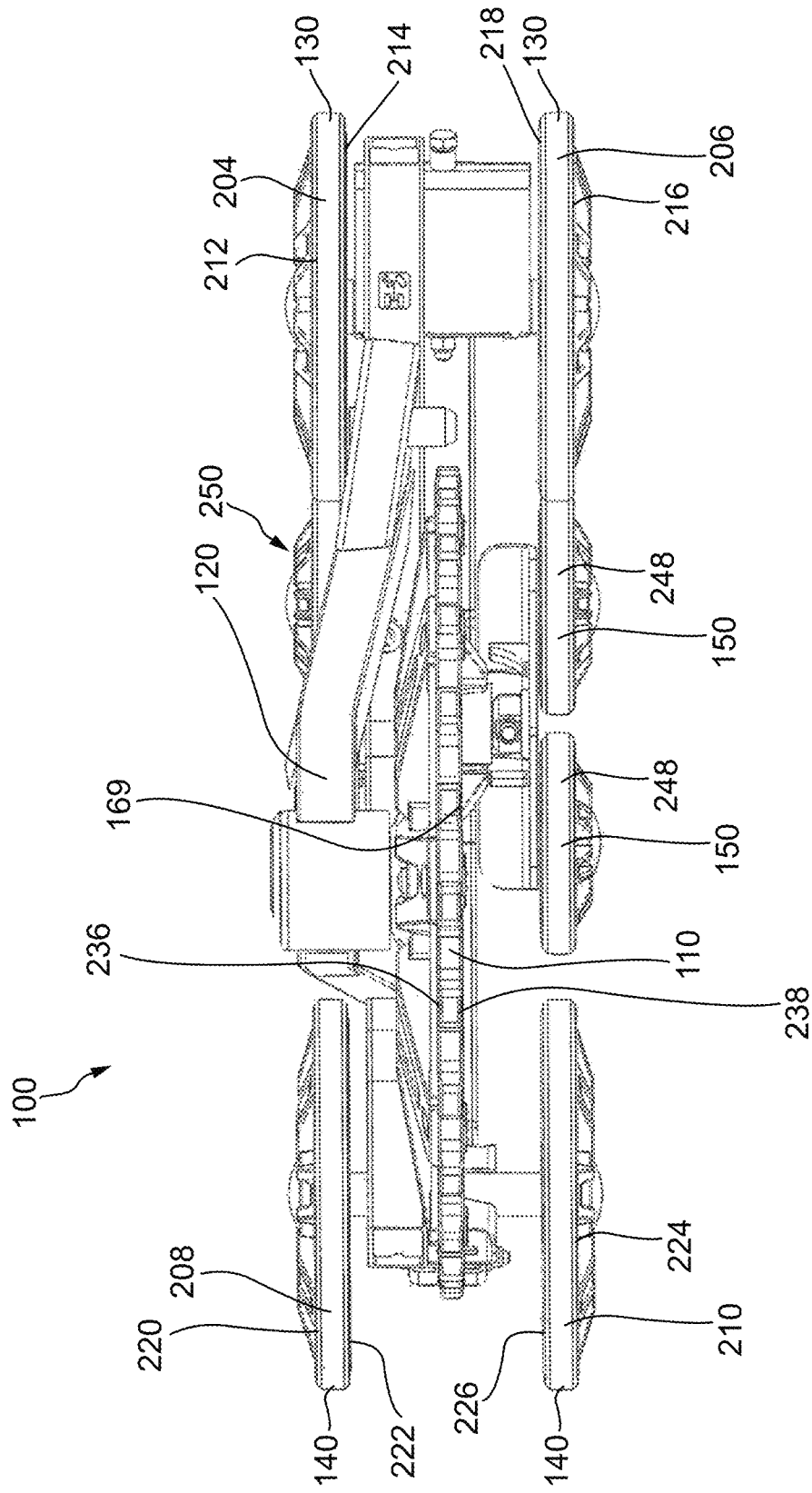

FIG. 13 is a top plan view of internal components of the track system as shown in FIG. 5.

Figure 14:
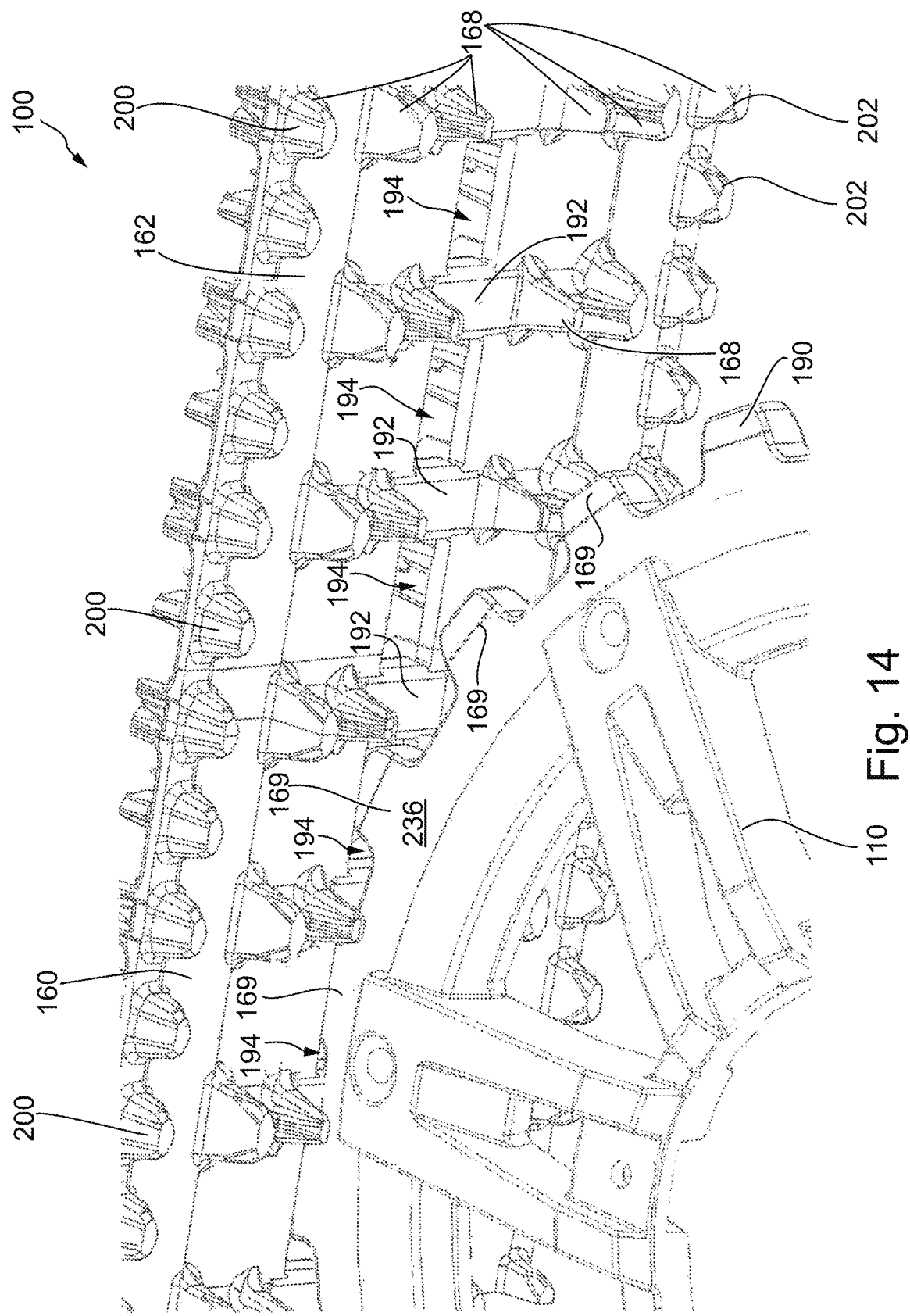

FIG. 14 is an expanded view of a portion of an endless track and sprocket wheel of the track system being an embodiment of the present technology.

Figure 15:
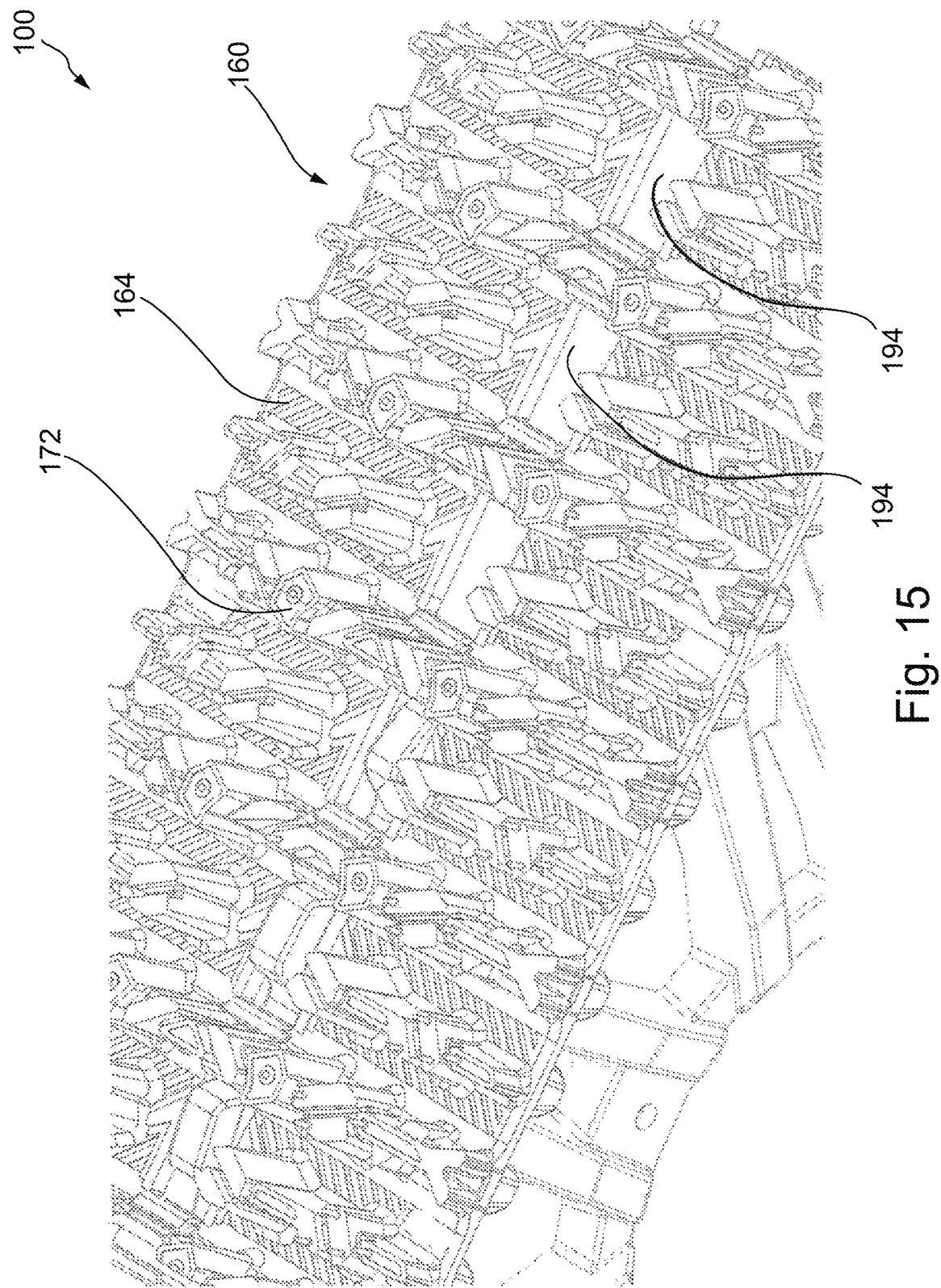

FIG. 15 is an upper perspective view the track system as shown in FIG. 14.

Figure 16:
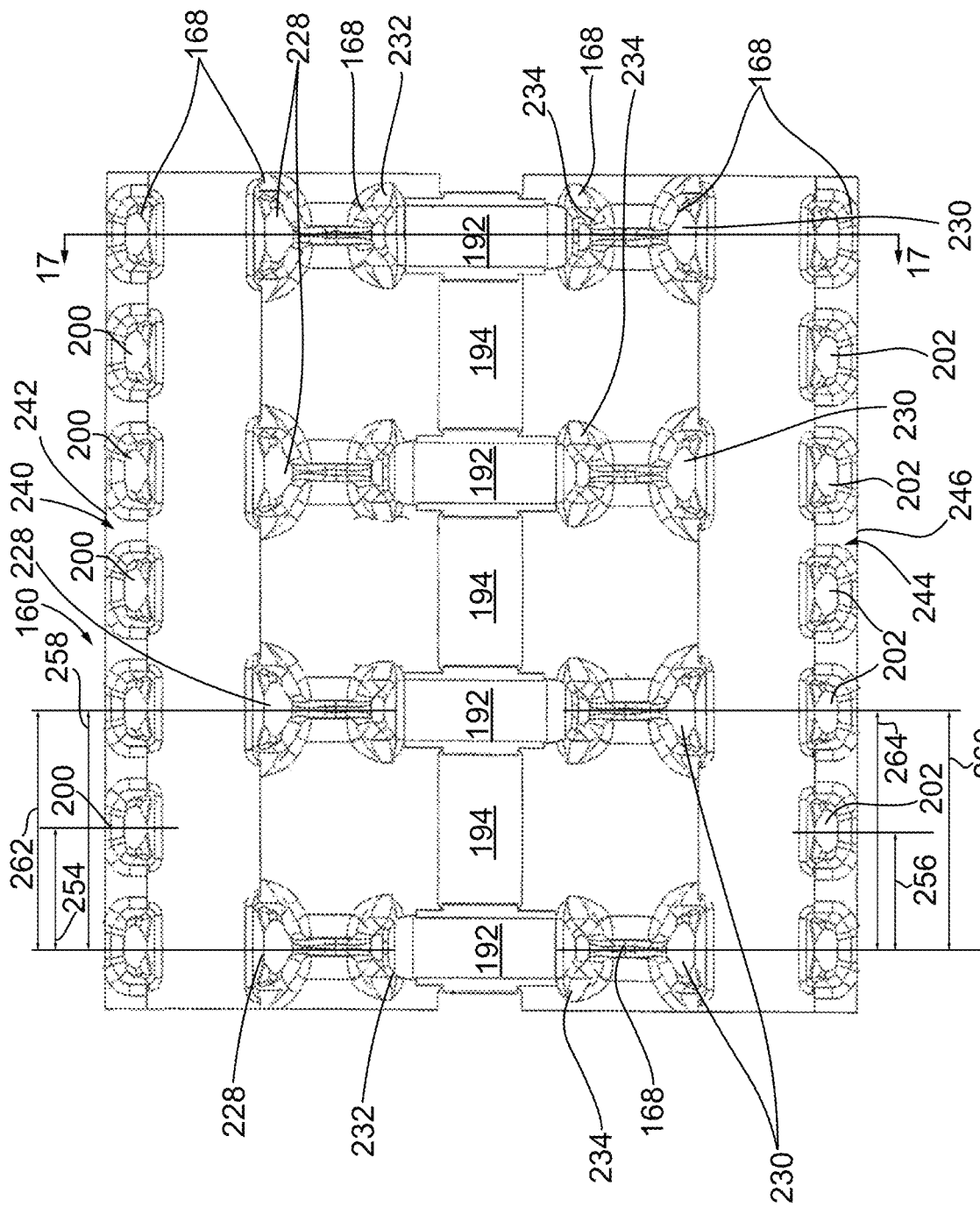

FIG. 16 is an inside view of a portion of the endless track of the track system as shown in FIG. 14.

Figure 17:
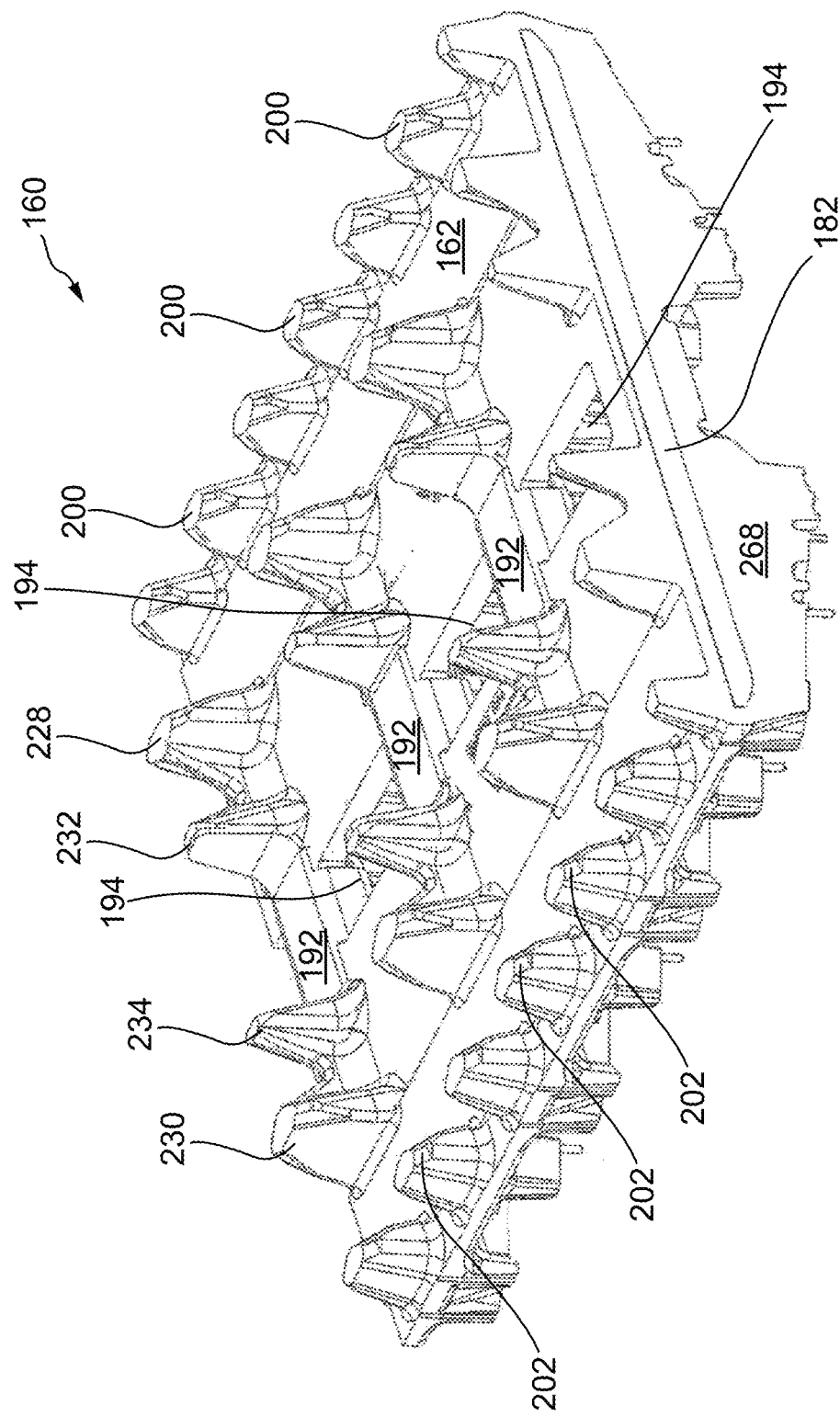

FIG. 17 is a perspective view a cross section along axis B-B of the endless track as shown in FIG. 16.

Figure 18:
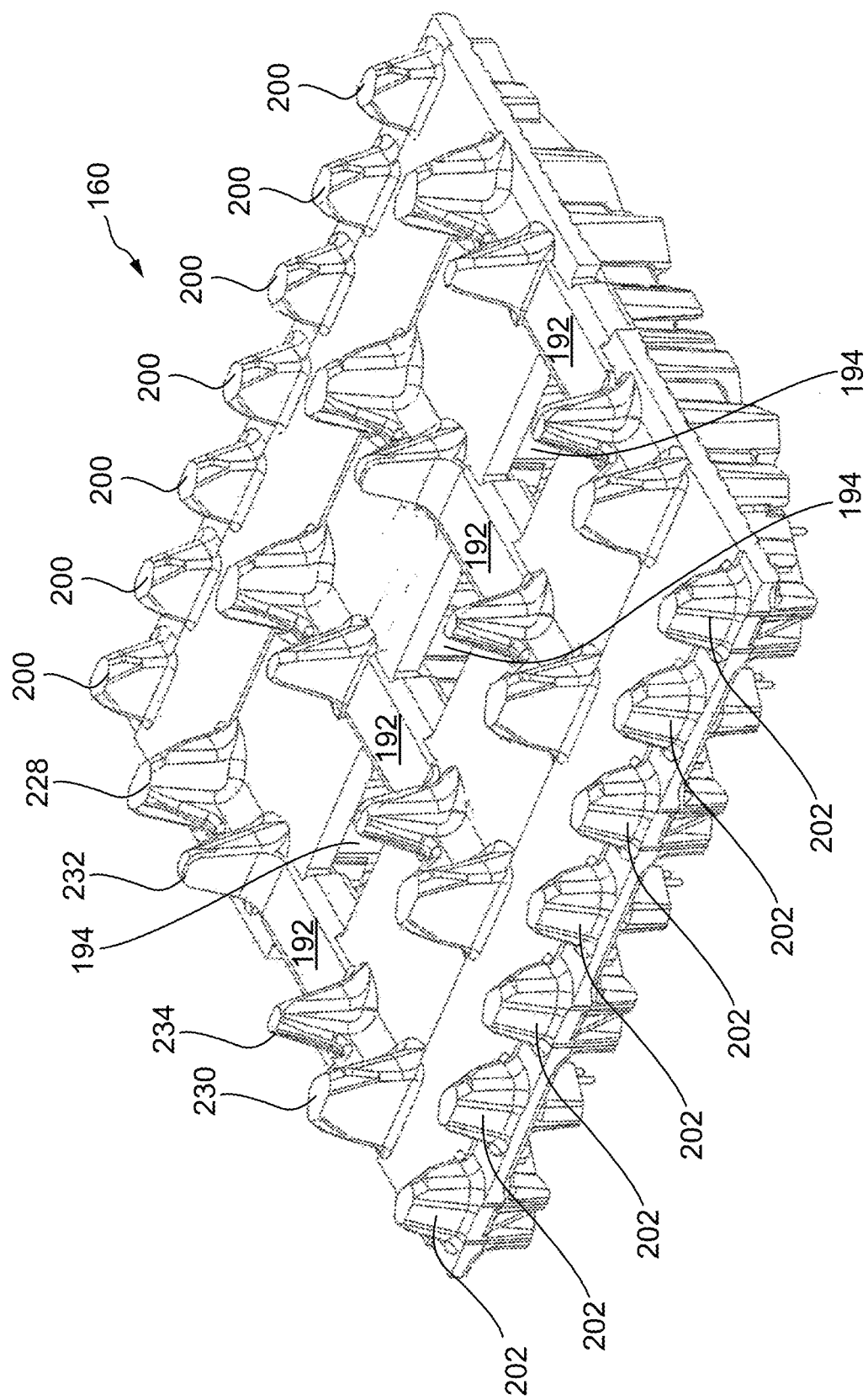

FIG. 18 is a perspective view the portion of the endless track as shown in FIG. 16.

Figure 19:
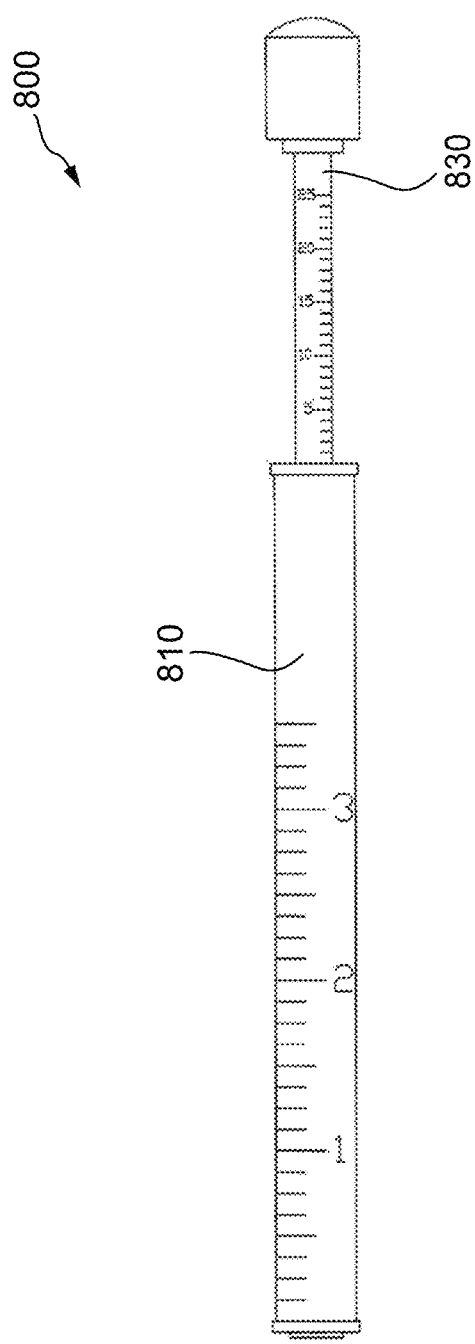

FIG. 19 is front elevated view of a tension tester tool.

Figure 20:
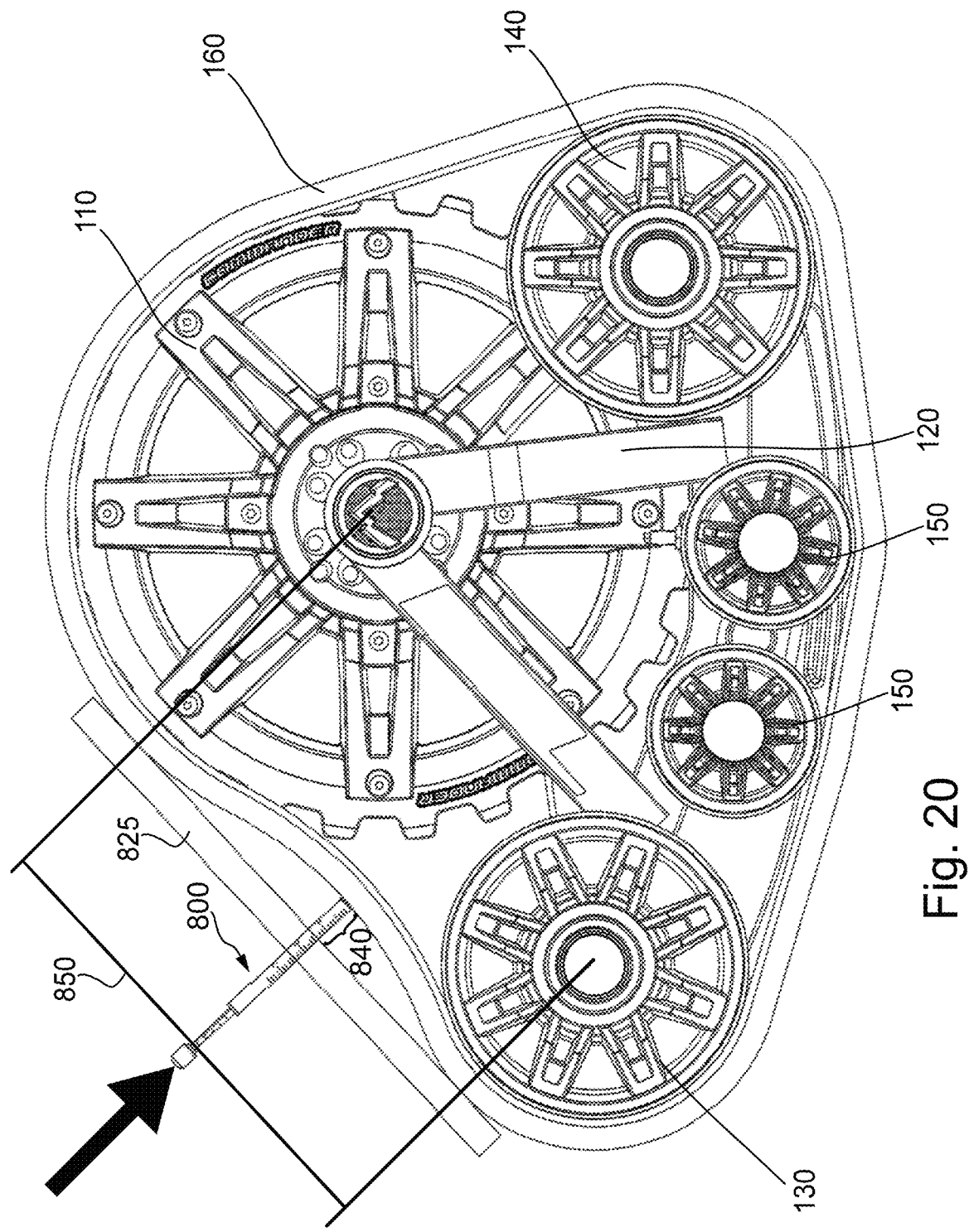

FIG. 20 is side elevation view of the track system as shown in FIG. 5 during tension measurement with the tool as shown in FIG. 19.

Figure 21:
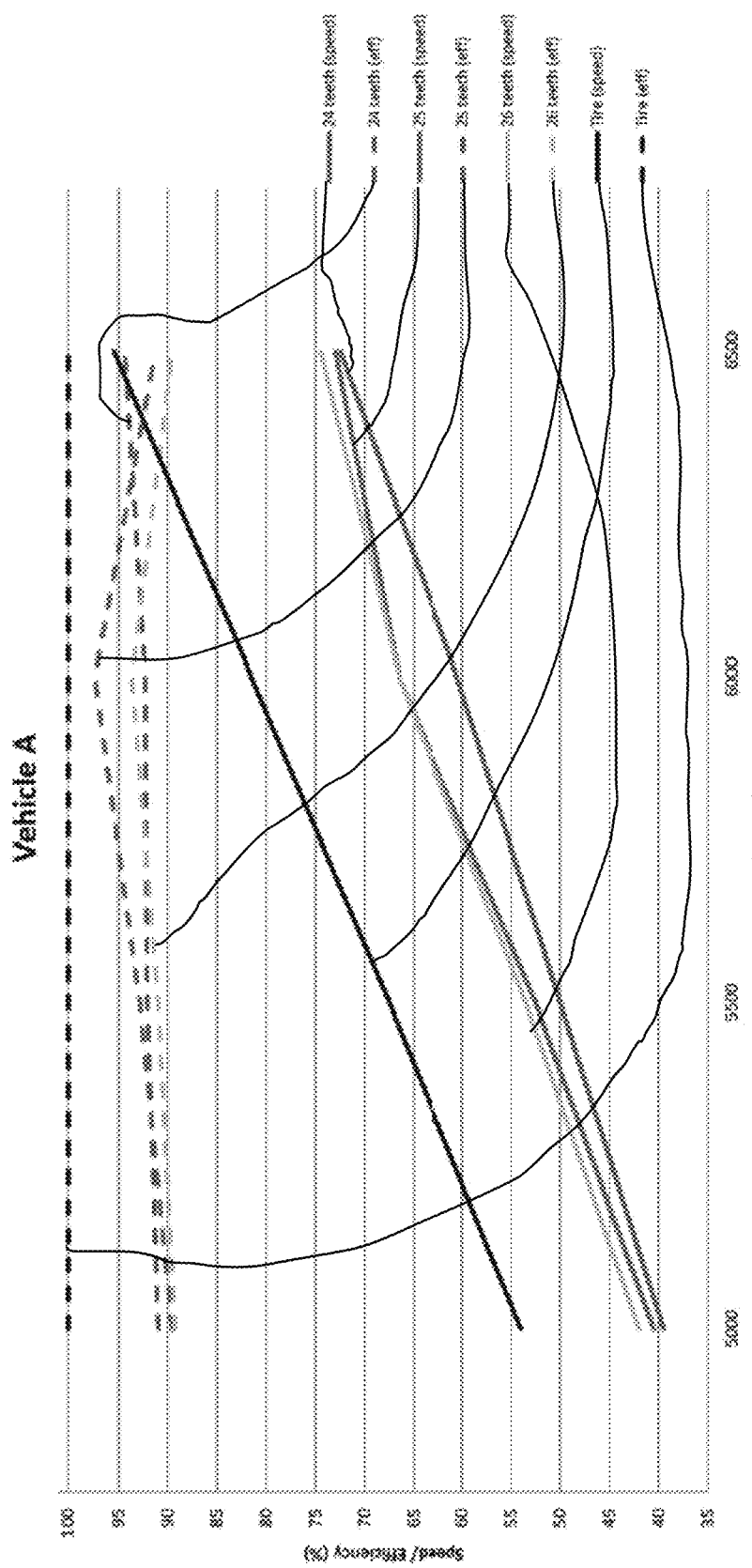

FIG. 21 is a graphic representation of an example measurement of the efficiency of a first vehicle equipped with various track systems of configurations being embodiments of the present technology compared with that of the vehicle when equipped with an OEM tire/wheel assembly.

Figure 22:
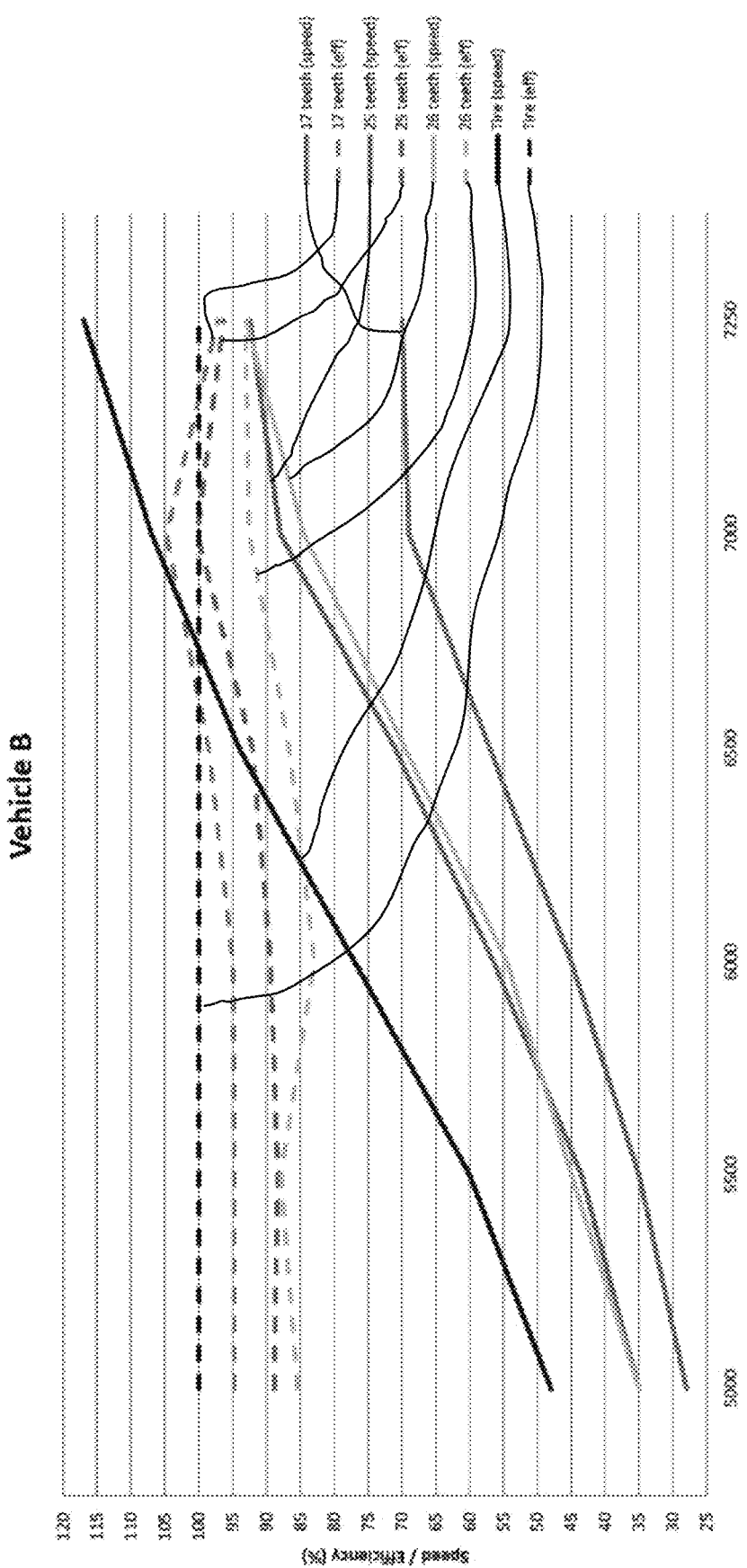

FIG. 22 is a graphic representation of an example measurement of the efficiency of a second vehicle equipped with various track systems of configurations being embodiments of the present technology compared with that of the vehicle when equipped with an OEM tire/wheel assembly.

DETAILED DESCRIPTION

Referring to FIG. 1, there is shown an ATV with a track system 100 being an embodiment of the present technology. It is to be expressly understood that the track system 100 is merely one implementation of the present technology. Thus, the description thereof that follows is intended to be only a description of an illustrative example of the present technology. This description is not intended to define the scope or set forth the bounds of the present technology. In some cases, what are believed to be helpful examples of modifications to the track system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the track system 100 may provide in certain instances a simple implementation of the present technology, and that where such is the case they have been presented in this manner as an aid to understanding. As persons skilled in the art would understand, various implementations of the present technology may be of a greater complexity.

Referring first to FIGS. 1-4, the track system 100 is configured to replace one of the tire/wheel assemblies 620 of an off-road wheeled vehicle (in the figures illustrated as conventional ATV 600) to assist in improving the floatation and/or traction thereof on some surfaces. ATV 600 has a chassis 610 (shown schematically), drive shafts 252 (shown schematically), and tire/wheel assemblies 620. Each of the tire/wheel assemblies has a wheel 660 and an OEM tire 650. Each OEM tire 650 has an OEM tire diameter 640 and an OEM tire width 630; being the same for all of the tire/wheel assemblies on ATV 600.

In the present embodiment, the track system 100 is configured to be able to replace both front and rear wheels 620 on ATV. This may be the case for some embodiments in respect of other, typically small-wheeled vehicles such as an ATV, a UTV, a SSV or other similar recreational vehicle. This is not always the case, however. In some embodiments of the present technology, a track system may be configured to replace only a rear wheel or a front wheel, or only a left wheel or a right wheel.

Now referring to FIGS. 5-10, in this embodiment, the track system 100 is generally triangular in shape. The track system has a drive wheel 110 (which in this embodiment is a sprocket wheel and in is generally referred to as such in the reminder of this description) configured to be mounted to the vehicle, specifically to the wheel huh thereof (not shown) in a conventional manner. The drive wheel 110 has an inner side 236 and an outer side 238. The track system 100 also has frame 120, a leading (front) idler wheel assembly 130 and a trailing (rear) idler wheel assembly 140 respectively mounted to the frame 120 at the forward end 122 and at the rearward end 124 thereof. Each idler wheel assembly 130, 140 has two idler wheels in this embodiment. Leading idler wheel assembly 130 has an outer leading idler wheel 204 (which itself has an outer side 212 and an inner side 214) and an inner leading idler wheel 206 (which itself has an outer side 218 and an inner side 216). Trailing idler wheel assembly 140 has an outer trailing wheel 208 (which itself has an outer side 220 and an inner side 222) and an inner trailing wheel 210 (which itself has an outer side 226 and an inner side 224. The idler wheels 204, 206, 208, 210 of each idler wheel assembly 130, 140 are capable of free rotation. (In other embodiments, the number of leading and/trailing idler wheels may differ.)

The track system 100 also has support roller assemblies 150 (also sometimes known in the art as road wheel assemblies or support wheel assemblies) mounted to the frame 120 intermediate the leading idler wheel assembly 130 and the trailing idler wheel assembly 140. The support rollers (outer support roller 250 and inner support roller 248) of each assembly 150 are capable of free rotation. In the present embodiment, there are two support roller assemblies 150. In other embodiments, the number of support roller assemblies may be larger or smaller (including zero). In the present embodiment, each support roller assembly 150 has two support rollers (an outer support roller 250 and an inner support roller 248). In other embodiments, the number of support rollers per support roller assembly may vary.

In the present embodiment, the width 270 of each of the idler wheels 204, 206, 208, 210 and the support rollers 248, 250 at their endless track contacting surfaces is the same. In other embodiments, this relationship may be different.

An endless track 160 is disposed about the sprocket wheel 110, the idler wheel assemblies 130, 140 and the support roller assemblies 150, and configured to be drivingly engaged by the sprocket wheel 110 (as is described in more detail below).

Still referring to FIGS. 5-10, in the present embodiment, the sprocket wheel 110 has a plurality of teeth 169 extending radially from the circumferential surface thereof. Also referring to FIG. 14, the endless track 160 has a series of spaced-apart holes 194 dimensioned and longitudinally-positioned along the endless track to intermesh with the teeth 169 of the sprocket wheel 110. Via this intermeshing, the sprocket wheel 110 drivingly engages the endless track 160 in this embodiment. This configuration is sometimes known in the art as the endless track being "externally driven". Having an externally driven track, a track system may be able to better withstand lower track tension without experiencing teeth jumps (also referred to as having a ratcheting effect) which can lead to detracking.

Referring to FIGS. 14-18, in this embodiment, located longitudinally on the inner surface 162 of the track 160 between successive holes 194 are a series of steel clips 192 which contact the teeth 169 of the sprocket wheel as the endless track 110 is being driven. (Thus applying the driving force at the neutral fiber point in the endless track in this embodiment.) The clips 192 allow for the operation of the track system at lower endless track tension with a reduced risk of detracking. These track clips 192 reduce the friction between the track and sprocket tooth 169 thus reducing the resistance generally encountered from the interaction of the sprocket wheel 110 and endless track 160. These clips are believed to improve the functioning of the very low tension track system 100. In other embodiments, the track clips are made from any other suitable hardened material such as other metals (i.e. iron) or polymers.

Also referring to FIG. 16, disposed along the inner surface 162 of the track 160 are several series of guide lugs 168, which are described in greater detail below. Also referring to FIG. 15, disposed along the outer surface 164 (ground-engaging surface) of the track 160 are several series of traction lugs that are configured to engage the ground surface 300 over which a vehicle 600 equipped with the track system 100 is operated.

In the present embodiment, the frame 120 is pivotally mounted to the sprocket wheel 110 assembly (which is mounted to the vehicle 600 wheel hub). In other embodiments, the frame 120 could be mounted directly to the vehicle (e.g. to the vehicle chassis).

Still referring to FIGS. 5-10, in the present embodiment, the track system 100 has two main characteristics, a larger sprocket wheel size and the ability to operate at a lower track tension. These two characteristics are preferred to obtain the desired performance from the present embodiment of the track system 100. The term 'performance' used throughout the present specification refers to a track system performing in a similar manner as a tire/wheel assembly, to the extent possible. As such, one of the factor used in assessing the performance of a track system is the top speed a vehicle (equipped with such a system) may reach. Notably, the efficiency of the track system 100 will also impact the speed of the vehicle.

Additionally, in the present embodiment, the track system 100 is equipped with a narrower track 160 (when compared with conventional track system tracks).

Thus, in some of the embodiments of the present technology (including the present one), the track 160 is less than 11½ inches wide. Specifically, in the present embodiment, the endless track 160 is approximately 11 inches in width (measured laterally from outer edge 242 to inner edge 246).

A narrower track may improve the efficiency of track system 100 as well as potentially provide improved handling and driving capabilities (with compared with some conventional track systems having wider tracks). An endless track having such a width is believed to diminish rolling resistance (as least as compared with some conventional track systems) as a narrower endless track can have reduced friction between the ground 300 and the endless track 160. A narrower endless track 160 also consumes less energy than a wider endless track (all other things being equal) when bending around sprocket wheel 110 and leading and trailing idler wheel assemblies 130 and 140 because of the hysteresis in the rubber. A narrower track has less rubber to bend (all other things being equal). In some embodiments of the present technology the endless track 160 has a width of between 75% and 125% of the OEM tire width. Such narrow tracks are not required, however, and, in some embodiments, track systems of the present technology are equipped with tracks having a width of 11½ inches or greater.

The sprocket wheel 110 has a diameter 274 (FIG. 9) that is from 65 to 100% (and typically 68 to 97%) of the diameter 640 of the OEM tire 650 the track system 100 replaces. In the present embodiment, a 25-tooth sprocket wheel 110 with a 20.1-inch diameter 274 is used in a track system 100 of the present technology to replace a tire/wheel assembly 620 of an ATV 600 having an OEM tire 650 with a 29.5-inch diameter 640. In this embodiment, the diameter 274 of the sprocket wheel 110 is 68% of the diameter 640 of the OEM tire 650. In another example, in another embodiment, a 29-tooth sprocket wheel with a 23.3-inch diameter could be used in a track system of the present technology to replace a tire/wheel assembly of an ATV having an OEM tire with a 24-inch diameter. In such embodiment, the diameter of the sprocket wheel is 97% of the diameter of the OEM tire.

In this embodiment of the present technology, various features of the track system allow the track system to be run with lower track tensions (as compared with conventional track systems). For example, by using an external-type sprocket wheel 110 (a sprocket wheel of the type where the sprocket wheel's teeth 169 intermesh with the holes 194 in the endless track 160 (to drive the endless track 160) and the sprocket wheel peripheral surfaces contact the clips 192, guidance (alignment) of the endless track 160 with respect to the sprocket wheel 110 is enhanced lowering the risk of "tooth skipping" and detracking.

In addition, on the endless track inner surface 162 of the lower run 266 of the track assembly 100, the slide rail 138 (sometimes known as a "guiding slide" in the art) is in continuous contact with the metal clips 192 to assist in enhancing proper track guidance, even at a relatively lower endless track tension. Friction between the endless track 160 and the frame 120 is also generally reduced by having the sprocket wheel 110 contact the steel of the clips 192 instead of rubber, a polymer or the like.

Now referring to FIG. 17, the endless 160 in this embodiment, the body (also known in the art as a carcass) of the endless track 160 is made of rubber. In other embodiments, the body may be made of any other suitable material or combination of materials (e.g. an elastomer(s)). Further, in this embodiment, the body 268 of the endless track 160 includes lateral reinforcing elements, rods 182. In other embodiments, such lateral reinforcing elements may not be present. In other embodiments, the body 268 of the endless track may have longitudinal reinforcing elements (with or without the presence of lateral reinforcing elements.) Examples of suitable longitudinal reinforcing elements include cables, cords, wire ropes, and the like. Examples of suitable lateral reinforcing elements include rods (such as rods 182), stiffeners or the like.

Referring now to FIGS. 14-18, extending outward from the inner surface 162 of the endless track 160 are several longitudinally-extending groups of guide lugs 168. A first such group of guide lugs 168 are longitudinally-spaced idler-wheel-contacting guide lugs 200 positioned to engage an outer side 212 of the outer leading idler wheel 204, the outer side 220 of the outer trailing idler wheel 208, and the outer sides of outer support rollers 250. A second such group of guide lugs 168 are longitudinally-spaced idler-wheelcontacting guide lugs 202 positioned to engage an inner side 216 of the inner leading idler wheel 206, the inner side 224 of the inner trailing idler wheel 210, and the inner sides of inner support rollers 248. A third such group of guide lugs 168 are longitudinally-spaced idler-wheel-contacting guide lugs 228 positioned to engage an inner side 214 of the outer leading idler wheel 204, the inner side 222 of the outer trailing idler wheel 208, and the inner sides of outer support rollers 250. A fourth such group of guide lugs 168 are longitudinally-spaced idler-wheel-contacting guide lugs 230 positioned to engage an outer side 218 of the inner leading idler wheel 206, the outer side 226 of the inner trailing idler wheel 224, and the outer sides of inner support rollers 248. A fifth such group of guide lugs 168 are longitudinally-spaced drive-wheel-contacting guide lugs 232 positioned to engage an outer side 236 of the sprocket wheel 110. A sixth such group of guide lugs are longitudinally-spaced drive-wheel-contacting guide lugs 234 positioned to engage an inner side 238 of the sprocket wheel 110. The longitudinally-spaced drive-wheel-contacting guide lugs 232, 234 are positioned to be longitudinally spaced apart from the apertures 194 and longitudinally aligned with the clips 192 (and the lugs 230, 232).

Referring to FIG. 16, the guide lugs 200 of the first group of lugs 168 have a lug spacing ("LS1-O") 254 which is the same as the lug spacing 256 ("LS1-I") of the guide lugs 202 of the second group of lugs 168. Thus, LS1-O=LS1-I. The guide lugs 228 of the third group of lugs 168 have a lug spacing 258 ("LS2-O") which is the same as the lug spacing 260 ("LS2-I") of the guide lugs 230 of the fourth group of lugs 168. Thus, LS2-O=LS2-I. In this embodiment, LS2-O/LS2-I are twice that of LS1-O/LS1-I. (In other embodiments, this relationship may differ.) The guide lugs 232 of the fifth group of lugs 168 have a lug spacing 262 ("LS3-O") that is the same as the lug spacing 264 ("LS3-I") of the guide lugs 234 of the sixth group of lugs 168. Thus, LS3-O=LS3-I. In this embodiment, LS3-O=LS3-I=LS2-O=LS2-I. Also in this embodiment, LS3-O/LS3-I are twice that of LS1-O/LS1-I. (In other embodiments, these relationships may differ.)

The use of drive lugs 200, 202 positioned at the lateral sides (outer lateral side 240, inner lateral side 244) of the endless track 160 enhances the ability of the wheels 204, 206, 208, 210, 250, 248 to support the endless track 160. This helps to maintain the proper alignment of the track 160, which is important when the vehicle is operated at a lower track tension to avoid detracking. Furthermore, positioning the drive lugs 200, 202 at the lateral edges (outer edge 242, inner edge 246) of the endless track 160 may assist in enabling the endless track 160 to withstand lateral forces that might otherwise cause the endless track 160 to bend. Bending of the endless track is generally not desirable as it might cause the guide lugs 168 to become misaligned and interfere with one or more of the wheels/rollers 204, 206, 208, 210, 250, 248, leading to a detracking.

Now referring to FIGS. 19-20, with respect to this embodiment of the present technology, the tension in the endless track 160 of the track system 100 is measured using the resulting tension of a point force at a given location in the track.

In this embodiment of the present technology, the typical operating tension of the endless track 160 of the track system 100 can be expressed as a 1½ inch deflection of the endless track 160 upon application of a 25-lb force at the midpoint of an unsupported distance 850 between the leading idler wheel assembly 130 and the sprocket wheel 110 of about 15⅝ inches. (All measurements described herein being taken on a vehicle that is in operating condition, stationary, and unloaded (having no riders nor cargo).) In this embodiment, an operating tension expressed as deflection of between 1¼ inches and 1¾ inches (again, upon application of a 25-lb force at the midpoint of an unsupported distance 850 between the leading idler wheel assembly 130 and the sprocket wheel 110 of about 15⅝ inches) is acceptable as it would not significantly affect the performance of the vehicle. (By contrast, conventional track systems usually have a tension expressed as a deflection of between ½ inch and ¾ inch under similar circumstances.) In other embodiments, for example, different unsupported distances could (and likely would) result in other acceptable deflection tolerances/ranges.

More generally, the typical operating tension of an endless track of the track system being an embodiment of the present technology can be expressed as a deflection of the endless track 160 upon application of a 25-lb force at the midpoint of an unsupported distance 850 between the leading idler wheel assembly 130 and the drive wheel (sprocket wheel 110) (or between the trailing idler wheel assembly 140 and the drive wheel (sprocket wheel 110)) as 10% of the length of that unsupported distance. (See FIG. 20.) In other embodiments, the deflection of the endless track (under the conditions described above) ranges between 9% and 11% of the length of the unsupported portion 850. In other embodiments, the deflection of the endless track (under the conditions described above) ranges between 8% and 12% of the length of the unsupported portion 850.

Now referring to FIGS. 19-20, a tension testing tool 800 is graded in inches on its lower portion 810 and pounds on its exterior portion 830. This tension tester tool 800 is commonly used to measure track tension in conventional track systems. (Although it is not required in the context of the present technology and other tension testing tools may be used.) To measure the tension of the endless track 160 using the tool 800, it is necessary to use a ruler 825 or some other straight object. The user places the ruler 825 between the sprocket wheel 110 and the leading idler wheel assembly 130. Then the user places the tool tension 800 at the midpoint of the unsupported portion 850 between the sprocket wheel 110 and the idler wheel assembly 130 and supports it to achieve the desired force (e.g. 25 lbs). This force creates a local deflection 840 of the endless track 160 and the amount of the deflection 840 is measured. In this embodiment, a force of 25 lbs on the endless track 160 yields a total deflection of 1½ inches. The reference measurement (or zero) is the ruler 825 that had been previously placed as described above. (Understandably, the 25-lb measurement is used as an example, a person skilled in the art would understand that tension could be measured using another reference force other than 25 lbs., in which case the deflection measurement should be proportionally adjusted.)

In this embodiment of the present technology, it is believed (without intending to be limiting) that the synergistic combination of a larger sprocket wheel 110 (compared with conventional track systems), a lower endless track track tension (compared with conventional track systems) and a narrower endless track (compared with conventional track systems) yield a track system, having an improved performance (compared with a conventional track system) and a driving behavior that better resembles that when driving the same vehicle using wheels.

Further, in this embodiment, the combination of the larger sprocket size and lower track tension provide a reduced rolling resistance caused by the interaction between the ground 300 and track system 100. By reducing the rolling resistance, it is thus possible to improve the overall efficiency of the track system 100 thus allowing the track system 100 to attain higher performances than known systems. In addition, in some embodiments, lower track tensions while using an externally driven allows the track system to attain very high efficiency, which may reach up to 90% efficiency at high speeds.

The efficiency of a track system (including track system 100) can be obtained by: (1) Operating the vehicle with a tire while steered straight on a given flat horizontal terrain at a specific engine speed (e.g. in RPM). (2) Determining the velocity of the vehicle (with the tire) under those conditions. (3) Dividing the track system's drive (sprocket) wheel diameter by the tire's diameter to obtain a ratio. (4) Multiplying the velocity (with the tire) determined in step 2 by the ratio determined in step 3 to obtain a theoretical velocity (of the vehicle with the track system). (5) Operating the vehicle with the track system under the same conditions as in step 1. (6) Determining the velocity of the vehicle (with the track system) under those conditions. (7) Dividing the velocity (with the track system) determined in step 6 by the theoretical velocity calculated in step 4 and multiplying the result by 100 to convert the number to a percentage. The percentage calculated in step (7) is the efficiency of the track system.

As an example, at a given engine speed, the speed of the vehicle when equipped with a track system having a 20.1-inch diameter sprocket wheel (in place of a tire having a 25-inch diameter) would theoretically be about 80% of the speed of the same vehicle when equipped with the tire (20.1/25×100=80.4%). At that given speed and on a given terrain, when equipped with the tire, were that vehicle's travel velocity to be 100 km/h, that same vehicle would theoretically have travel velocity of about 80 km/h when equipped with the track system. If that were actually the case (i.e. that the vehicle's travel velocity were about 80 km/h), the track system's efficiency would be about 100%. However, under most actual operating conditions, a vehicle equipped with a track system is not 100% efficient owing to rolling resistance induced by the track system and by the softness of the terrain over which the vehicle travels.

Referring to FIGS. 21-22, exemplary measurement data is provided. In FIGS. 21-22 the efficiency and vehicle speed for different-sized track system sprocket wheels is plotted against engine speed (with track tension and terrain being the same for all). As can be seen in the graphs, the 25-tooth sprocket wheel is more efficient in a given RPM range than a 26-tooth sprocket wheel, even if the vehicle speeds are almost the same. Thus, all other things being equal, vehicle fuel consumption would be lower and engine life increased, the more efficient the track system is.

In the present disclosure, where specific materials for any track system 110 component have not been provided, any suitable conventional material (or combination of materials) may be used. Where specific materials for any such component have been provided, any suitable conventional material may also be used.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. An endless track disposed onto a track system, the track system to be mounted on a vehicle, the endless track having: an inner surface to be disposed around a drive wheel of the track system,
a leading idler wheel assembly of the track system, and
a trailing idler wheel assembly of the track system,
the endless track having an unsupported portion between the drive wheel and one of the leading idler wheel assembly and the trailing idler wheel assembly, the unsupported portion having a length and a center, the unsupported portion deflecting a distance of between 8% and 12% of its length on application of a 25-lb. force at its center, as measured by placing a straight object on the endless track between the drive wheel and the one of the leading idler wheel assembly and the trailing idler wheel assembly and placing a tension measuring tool at the center of the unsupported portion between the drive wheel and the one of the leading idler wheel assembly and the trailing idler wheel assembly so as to create the 25-lb. force at the center.

2. The endless track of claim 1, wherein the endless track has a plurality of spaced-apart apertures dimensioned and longitudinally-positioned along the endless track suitable for intermeshing with teeth of the drive wheel.

3. The endless track of claim 2, wherein the endless track has a plurality of metallic clips longitudinally-positioned along the inner surface of the endless track between the plurality of apertures.

4. The endless track of claim 3, wherein the plurality of metallic clips is suitable to contact a slide rail disposed along a lower run of the endless track.

5. The endless track of claim 4, wherein the plurality of metallic clips is suitable to contact a slide rail disposed along a lower run of the endless track such that as the endless track rotates the clips contact the slide rail along a lower run of the track.

6. The endless track of claim 1, wherein the inner surface of the endless track comprises:
a first plurality of longitudinally-spaced drive-wheel-contacting guide lugs positioned to engage an inner side of the drive wheel, and
a second plurality of longitudinally-spaced drive-wheel-contacting guide lugs positioned to engage an outer side of the drive wheel.

7. The endless track of claim 1, wherein
the inner surface of the endless track has a first plurality of longitudinally-spaced idler-wheel-contacting guide lugs positioned to engage an outer side of an outer leading idler wheel and an outer side of an outer trailing idler wheel;
the inner surface of the endless track has a second plurality of longitudinally-spaced idler-wheel-contacting guide lugs positioned to engage an inner side of an inner leading idler wheel and an inner side of an inner trailing idler wheel; the inner surface of the endless track has a third plurality of longitudinally-spaced idler-wheel-contacting guide lugs positioned to engage an inner side of the outer leading idler wheel and an inner side of the outer trailing idler wheel;
the inner surface of the endless track has a fourth plurality of longitudinally-spaced idler-wheel-contacting guide lugs positioned to engage an outer side of the inner leading idler wheel and an outer side of the inner trailing idler wheel.

8. The endless track of claim 7, wherein
the first plurality of longitudinally-spaced idler-wheel-contacting guide lugs and the second plurality of longitudinally-spaced idler-wheel-contacting guide lugs have a same lug spacing, being a first lug spacing;

the third plurality of longitudinally-spaced idler-wheel-contacting guide lugs and the fourth plurality of longitudinally-spaced idler-wheel-contacting guide lugs have a same lug spacing, being a second lug spacing; and the second lug spacing is greater than the first lug spacing.

9. The endless track of claim 8, wherein the second lug spacing is twice the first lug spacing.

10. The track system of claim 8, wherein the inner surface of the endless track has a first plurality of longitudinally-spaced drive-wheel-contacting guide lugs positioned to engage an inner side of the drive wheel;

a second plurality of longitudinally-spaced drive-wheel-contacting guide lugs positioned to engage an outer side of the drive wheel;

the first plurality of longitudinally-spaced drive-wheel-contacting guide lugs and the second plurality of longitudinally-spaced drive-wheel-contacting guide lugs have a same lug spacing, being a third lug spacing; and the third lug spacing is equal to the second lug spacing.

11. The endless track of claim 10, wherein the endless track has a plurality of spaced-apart apertures dimensioned and longitudinally-positioned along the endless track suitable for intermeshing with teeth of the sprocket wheel; and the first plurality of longitudinally-spaced drive-wheel-contacting guide lugs and the second plurality of longitudinally-spaced drive-wheel-contacting guide lugs are positioned to be longitudinally spaced apart from the apertures.

12. The endless track of claim 7, wherein the first plurality of longitudinally-spaced idler-wheel-contacting guide lugs are positioned along an edge of the endless track; and the second plurality of longitudinally-spaced idler-wheel-contacting guide lugs are positioned along an opposite edge of the endless track.

13. The endless track of claim 7, wherein the first plurality of longitudinally-spaced idler-wheel-contacting guide lugs, the second plurality of longitudinally-spaced idler-wheel-contacting guide lugs, the third plurality of longitudinally-spaced idler-wheel-contacting guide lugs, and the fourth plurality of longitudinally-spaced idler-wheel-contacting guide lugs are each suitable for engagement with a side of a support roller of a support roller assembly.

14. The endless track of claim 1, the endless track having a width of between about 75% and about 125% of an OEM tire width.

15. The endless track of claim 14, wherein the width of the endless track is less than 11½ inches.

16. The endless track of claim 1, wherein the unsupported portion has a length of about 15⅜ inches and the unsupported portion deflects a distance of between about 1¼ inches and about 1¾ inches on application of the 25-lb. force.

17. The endless track of claim 7, the inner surface of the endless track further having a fifth plurality of longitudinally-spaced drive-wheel-contacting guide lugs positioned to engage an outer side of the drive wheel.

18. The endless track of claim 17, the inner surface of the endless track further having a sixth plurality of longitudinally-spaced drive-wheel-contacting guide lugs positioned to engage an inner side of the drive wheel.

19. The endless track of claim 1, wherein the track system is to be mounted on the vehicle in place of a rotatable wheel assembly.

* * * * *